(12) United States Patent
Schultz et al.

(10) Patent No.: US 8,916,987 B2
(45) Date of Patent: Dec. 23, 2014

(54) HYDROKINETIC ELECTRICAL GENERATING DEVICE

(75) Inventors: Garth J. Schultz, Oxford, MI (US); Scott M. Leslie, Markham (CA); James A. Speck, Commerce, MI (US)

(73) Assignee: Wingmill Marine Energy, Inc., Oxford, MI (US)

( * ) Notice: Subject to any disclaimer, the term of this patent is extended or adjusted under 35 U.S.C. 154(b) by 93 days.

(21) Appl. No.: 13/823,342

(22) PCT Filed: Aug. 31, 2011

(86) PCT No.: PCT/US2011/049861
§ 371 (c)(1),
(2), (4) Date: Jul. 10, 2013

(87) PCT Pub. No.: WO2012/036900
PCT Pub. Date: Mar. 22, 2012

(65) Prior Publication Data
US 2013/0285384 A1    Oct. 31, 2013

Related U.S. Application Data

(60) Provisional application No. 61/382,605, filed on Sep. 14, 2010.

(51) Int. Cl.
*F03B 13/12* (2006.01)
*F03B 13/10* (2006.01)
*F03B 17/06* (2006.01)

(52) U.S. Cl.
CPC ........... *F03B 13/10* (2013.01); *F05B 2260/421* (2013.01); *Y02E 10/28* (2013.01); *F03B 17/06* (2013.01); *F05B 2260/4021* (2013.01)
USPC .............................................. 290/53; 290/54

(58) Field of Classification Search
USPC .......... 290/42, 43, 53, 54; 415/141, 160, 163, 415/3.1, 4.2, 4.4, 8, 122.1, 125, 907; 416/11, 53, 59, 68, 136, 142
See application file for complete search history.

(56) References Cited

U.S. PATENT DOCUMENTS 3,743,848 A * 7/1973 Strickland ........................ 290/55
3,995,972 A * 12/1976 Nassar .............................. 416/68
(Continued)

FOREIGN PATENT DOCUMENTS

KR    10-2010-0094767 A    8/2010

OTHER PUBLICATIONS

International Search Report and Written Opinion of the International Searching Authority (in English), mailed Mar. 28, 2012; ISA/KR.

*Primary Examiner* — Tho D Ta
*Assistant Examiner* — Viet Nguyen
(74) *Attorney, Agent, or Firm* — Harness, Dickey & Pierce, P.L.C.

(57) ABSTRACT

A hydrokinetic electrical generating device includes first and second wing assemblies each having axis vertical wings. First and second beam assemblies support the first or second wing assemblies. A first sliding member is slidably connected to the first beam assembly and a second sliding member is slidably connected to the second beam assembly. The axis vertical wings are rotatably connected to one of the first or second sliding members. A first sliding connector is connected to the first sliding member and a second sliding connector connected to the second sliding member. A mechanical-electrical section has first and second flywheels connected by a first or second drive belt to a generator. First and second flywheel connecting rods connect the first or second sliding connector to the first or second flywheel. A water force rotating the wings displaces the connecting rods causing flywheel and drive belt rotation thereby operating the generator.

34 Claims, 28 Drawing Sheets

(56) References Cited

U.S. PATENT DOCUMENTS

| | | | |
|---|---|---|---|
| 4,347,036 A * | 8/1982 | Arnold | 416/1 |
| 4,915,584 A * | 4/1990 | Kashubara | 416/64 |
| 5,136,174 A * | 8/1992 | Simoni | 290/54 |
| 6,273,680 B1 * | 8/2001 | Arnold | 416/1 |
| 6,323,563 B1 | 11/2001 | Kallenberg, Jr. | |
| 6,489,691 B1 * | 12/2002 | Lang | 290/44 |
| 6,652,232 B2 | 11/2003 | Bolduc | |
| 7,946,113 B1 * | 5/2011 | Bishop | 60/398 |
| 8,278,776 B1 * | 10/2012 | Arntz | 290/54 |
| 8,710,789 B2 * | 4/2014 | Mardirossian | 320/101 |
| 2010/0045046 A1 | 2/2010 | Douglas | |
| 2010/0181773 A1 * | 7/2010 | Reist | 290/54 |
| 2010/0276934 A1 * | 11/2010 | Francis | 290/54 |

\* cited by examiner

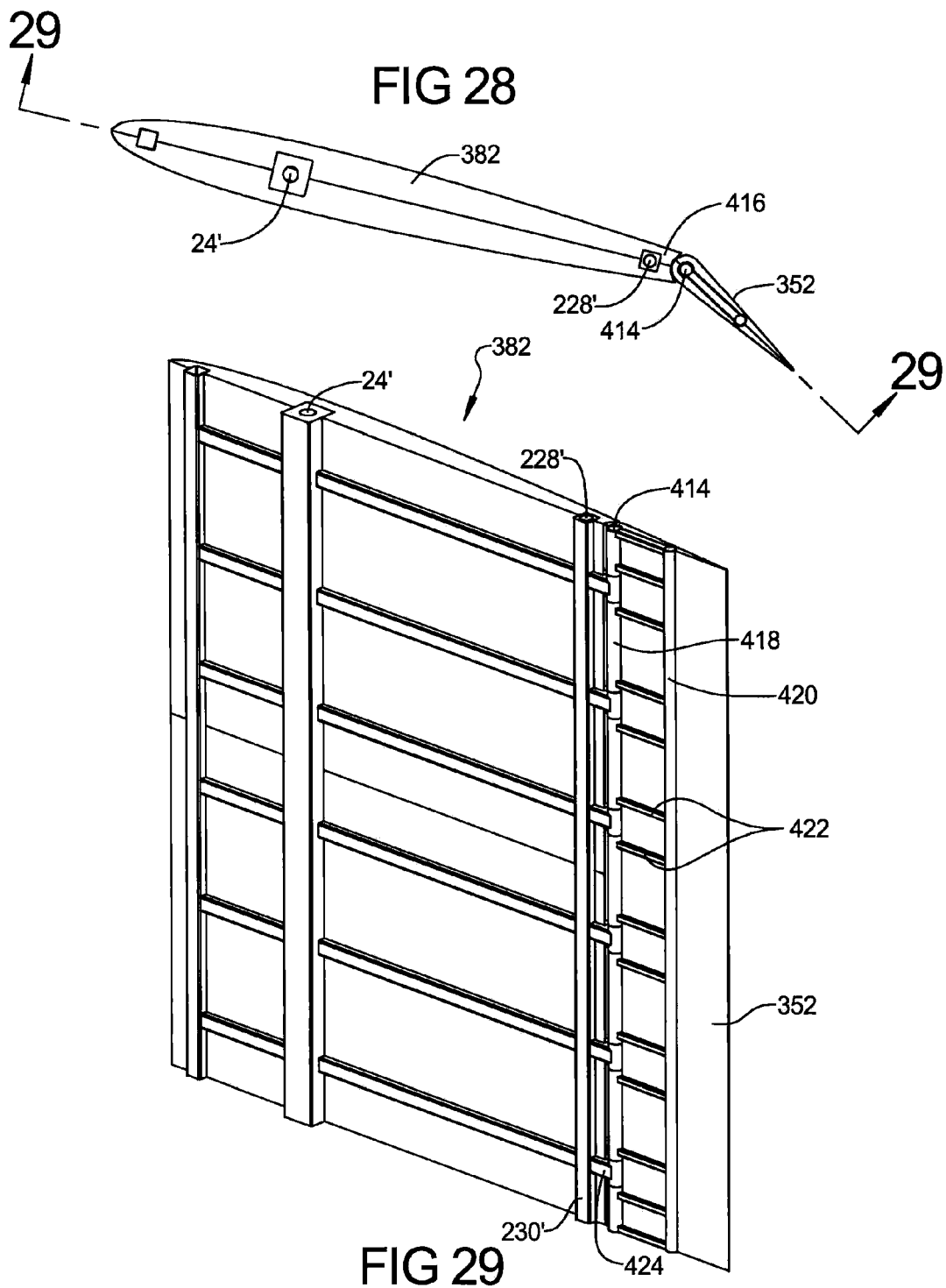

HYDROKINETIC ELECTRICAL GENERATING DEVICE

FIELD

The present disclosure relates to hydrokinetic electrical generating devices converting the energy of flowing water to electrical energy.

BACKGROUND

This section provides background information related to the present disclosure which is not necessarily prior art.

Air blade/turbine designs are known that convert the velocity of air in the form of wind to a rotation of a turbine or generator to create electricity. Air conversion systems are commonly limited to placement in areas where steady wind speeds are common, limiting their effective use. Water conversion devices are generally more efficient than air conversion devices because flowing water has approximately 832 times more energy density than flowing air. An increase in flow increases a power output as a function of the square of the velocity increase. Wave energy devices are known which use the upward and downward movement of waves to create electricity. Wave devices, however, can require a significant distance from land, which increases the complexity of building and maintaining these devices. Dams block or substantially block water channels such as rivers and streams and commonly direct a stored column or head of water through rotating turbines to generate electricity. Dams, however, can create significant ecological problems, and are commonly expensive to build and maintain. Dams also rely on the height of the water column and therefore are commonly required to be located where the greatest available stored water column can be stored, limiting their placement sites.

SUMMARY

This section provides a general summary of the disclosure, and is not a comprehensive disclosure of its full scope or all of its features.

According to several embodiments, a hydrokinetic electrical generating device includes at least one wing assembly having at least one axis vertical wing. A horizontal wing support beam assembly has at least one sliding member slidably connected to the wing support beam assembly. A pivot rod extends from the at least one wing and is rotatably connected to the at least one sliding member such that the at least one wing is rotatable with respect to the pivot rod as the at least one sliding member slides with respect to the wing support beam assembly. A mechanical-electrical section has a flywheel rotatably connected by a drive belt to an electrical generator. A slide connector is slidably connected to the at least one sliding member. A flywheel connecting rod is rotatably connected to both the slide connector and the flywheel such that sliding motion of the at least one sliding member due to a water flow force acting on the at least one wing is transferred through the pivot rod to displace the at least one sliding member and acts through the flywheel connecting rod to rotate the flywheel and via the drive belt acts to rotate the generator.

According to other embodiments, a hydrokinetic electrical generating device includes first and second wing assemblies each having axis vertical wings. First and second horizontal wing support beam assemblies each support one of the first or second wing assemblies. A first sliding member is slidably connected to the first wing support beam assembly and a second sliding member is slidably connected to the second wing support beam assembly. The axis vertical wings are rotatably connected to one of the first or second sliding members. A first sliding connector is connected to the first sliding member and a second sliding connector is connected to the second sliding member. A mechanical-electrical section has first and second flywheels individually rotatably connected by one of first and second drive belts to a generator. A first flywheel connecting rod connects the first sliding connector to the first flywheel and a second flywheel connecting rod connects the second sliding connector to the second flywheel such that a water force causing rotation of the axis vertical wings of the first and second wing sets causes rotation of the first and second flywheels to thereby operate the generator.

According to other embodiments, a pivot rod extends from the at least one wing and is rotatably connected to the at least one sliding member such that the at least one wing is rotatable with respect to the pivot rod as the at least one sliding member slides with respect to the wing support beam assembly. A mechanical-electrical section includes a flywheel rotatably connected by a drive belt to an electrical generator, a first elliptical member co-rotatable with the flywheel, and a second elliptical member rotatably connected by a second drive belt to the first elliptical member. A slide connector is slidably connected to the at least one sliding member. A flywheel connecting rod is rotatably connected to the slide connector and to the flywheel, such that sliding motion of the at least one sliding member due to a force acting on the at least one wing is transferred through the pivot rod to displace the at least one sliding member and acts through the flywheel connecting rod to rotate the flywheel and via the drive belt acts to rotate the generator.

According to still further embodiments, first and second piers support the horizontal wing support beam assembly between the first and second piers. A pivot rod extends from individual ones of the plurality of wings and is rotatably connected to the at least one sliding member such that each of the plurality of wings is rotatable with respect to the pivot rod as the at least one sliding member slides with respect to the wing support beam assembly, moving the at least one wing assembly horizontally toward and away from the first pier. A mechanical-electrical section has a flywheel rotatably connected by a drive belt to an electrical generator. The flywheel is linked to the at least one wing set and is rotated by the horizontal motion of the at least one wing assembly to operate the generator.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 28 is a top left rear perspective view of a further wing design of the present disclosure having a rotatable aileron; and FIG. 29 is a top left rear cross sectional perspective view taken at section 29 of FIG. 28.

Corresponding reference numerals indicate corresponding parts throughout the several views of the drawings.

DETAILED DESCRIPTION

Figure 1:
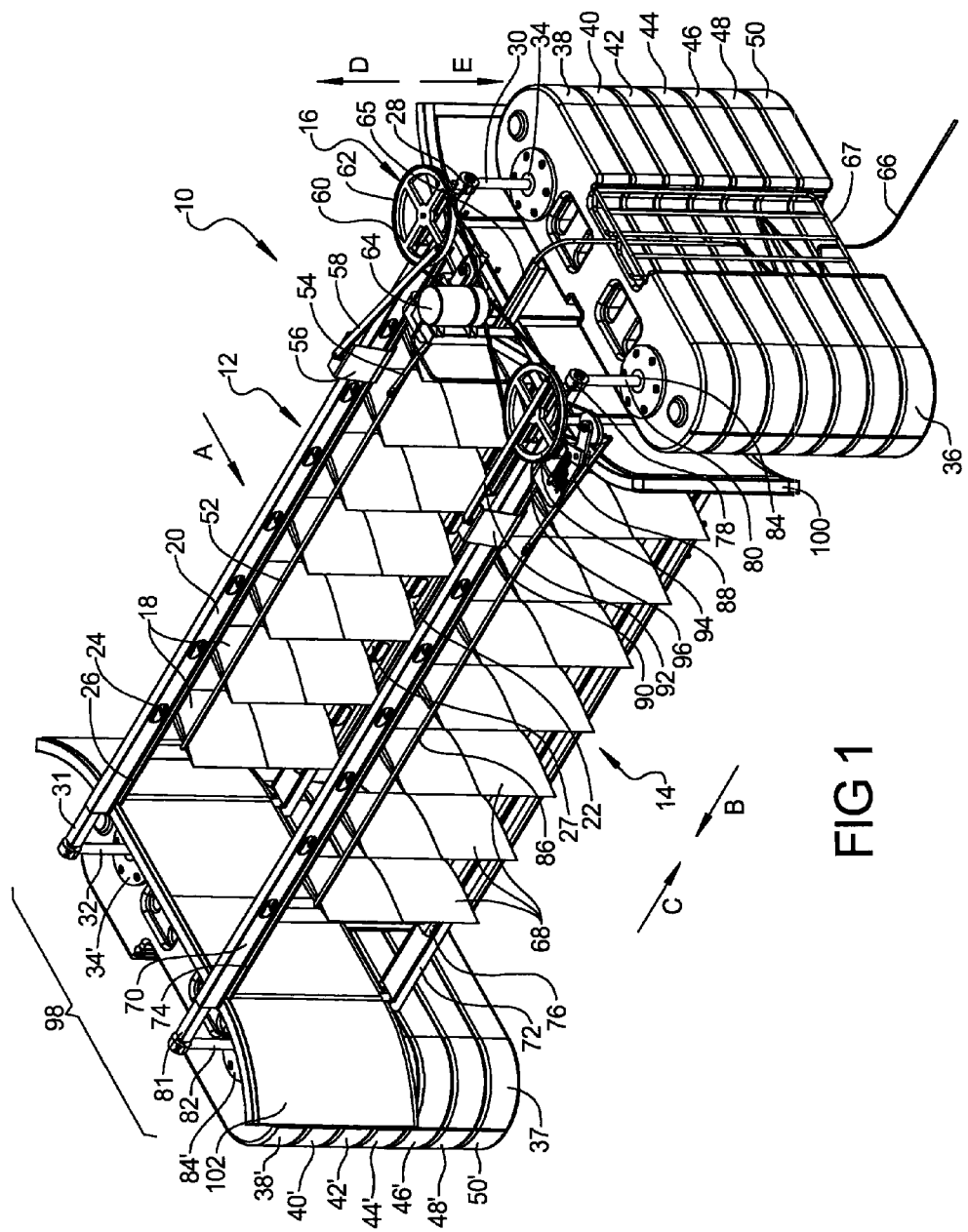
FIG. 1 is a top rear right perspective view of a hydrokinetic electrical generating device of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Referring to FIG. 1, a hydrokinetic electrical generating device 10 includes each of a first wing assembly 12 and a second wing assembly 14. A mechanical-electrical section 16 uses the mechanical force generated by motion of the first and second wing assemblies 12, 14 to generate electricity. A plurality of first axis-vertical wings 18 are provided with first wing assembly 12. The first axis-vertical wings 18 are each rotatably supported between a first upper wing support beam 20 and a first lower wing support beam 22. Each of the first axis-vertical wings 18 includes a pivot rod 24 extending from both top and bottom sides such that pivot rod 24 is rotatably connected to a first upper sliding member 26 and a second lower sliding member 76 which is shown and described in reference to FIG. 13.

A first beam first end 28 of first upper wing support beam 20 is connected to a first support shaft 30. A first beam second end 31 of first upper wing support beam 20 is connected to a second support shaft 32. First and second support shafts 30, 32 are individually connected to each of a support shaft cylinder 34, 34' which are fixedly received in each of a first and opposite second multiple segment pier 36, 37. Each of the first and second multiple segment piers 36, 37 is a mirror image configuration of each other and each includes a plurality of pier segments (i.e., shown as first, second, third, fourth, fifth, sixth, and seventh pier segments 38, 40, 42, 44, 46, 48, 50). The quantity of pier segments used for first and second multiple segment piers 36, 37 can vary depending on a depth of the water that hydrokinetic electrical generating device 10 will be operating in.

Water is received at an upstream end of hydrokinetic electrical generating device 10 in an inlet flow direction "A". Each of the first and second wing assemblies 12, 14 moves in a side-to-side motion with respect to a first wing movement direction "B" in an opposite second wing movement direction "C" as the individual wings of the first and second wing assemblies 12, 14 rotate. The first and second support shafts 30, 32 are each slidably received in the support shaft cylinders 34, 34' of the first and second multiple segment piers 36, 37 to permit the first and second wing assemblies 12, 14 to vertically rise in a rising direction "D" and to oppositely lower in a lowering direction "E". The ability to move in either of the rising or lowering directions "D", "E" allows the hydrokinetic electrical generating device 10 to be used in areas having different water depth columns, seasonal changing depth columns, and water column depths that can change as a result of tidal flow.

Referring again specifically to first wing assembly 12, each of the individual first axis-vertical wings 18 is commonly connected and spaced using a first wing set control arm 52, which ensures that each of the first axis-vertical wings 18 is parallel with all the other first axis-vertical wings 18. First wing set control arm 52 is, in turn, rotatably connected to a first wing set connecting arm 54. First wing set connecting arm 54 is, in turn, connected to components of mechanical-electrical section 16, which will be better described in reference to FIG. 6. A first slide connector 56 is fixed to first upper sliding member 26 and therefore moves in either of the first or second wing movement directions "B", "C" together with first wing assembly 12. First slide connector 56 is rotatably connected to a first flywheel connecting rod 58 which in turn is rotatably connected to a first flywheel 60 of mechanical-electrical section 16.

As the first wing assembly 12 moves in either the first or second wing movement direction "B", "C", the simultaneous sliding motion of first slide connector 56, via its connection using first flywheel connecting rod 58, causes axial rotation of first flywheel 60. First flywheel 60 is connected using a first flywheel drive belt 62 to an AC generator 64. Electrical power created by the continuous rotation of first flywheel 60, and thereby internal windings (not shown) of AC generator 64, generate electrical power which is transferred using a power cable 66 to an off site location. Power cable 66 is supported using a cable support 65 proximate to AC generator 64 as well as a cable guard 67 connected to first multiple segment pier 36.

Hydrokinetic electrical generating device 10 further includes a plurality of second axis-vertical wings 68 which are rotatably connected to second wing assembly 14 in the same way as first axis-vertical wings 18 are connected to first wing assembly 12. Second wing assembly 14 is, therefore, substantially a duplicate of first wing assembly 12. Second wing assembly 14 includes a second upper wing support beam 70 spatially separated from a second lower wing support beam 72 between which the plurality of second axis-vertical wings 68 are rotatably connected. A second upper sliding member 74 is slidably connected to second upper wing support beam 70 and a second lower sliding member 76 is slidably connected to second lower wing support beam 72. Each of the second axis-vertical wings 68 is rotatably connected to the second upper and second lower sliding members 74, 76 such that the plurality of second axis-vertical wings 68 can similarly move in either of the first or second wing movement directions "B", "C".

A second beam first end 78 of second upper wing support beam 70 is connected to a third support shaft 80. Similarly, a second beam second end 81 of second upper wing support beam 70 is connected to a fourth support shaft 82. Third and fourth support shafts 80, 82 function similarly to first and second support shafts 30, 32 to permit upward and downward motion of first and second wing assemblies 12, 14 in either the rising direction "D" or the lowering direction "E" with respect to the first and second multiple segment piers 36, 37. To accomplish this, third support shaft 80 is slidably received in a support shaft cylinder 84 and fourth support shaft 82 is slidably received in a support shaft cylinder 84' (not clearly visible in this view) connected to second multiple segment pier 37. A second wing set control arm 86 is rotatably connected to each of the second axis-vertical wings 68 and performs the same function as first wing set control arm 52. Second wing set control arm 86 is rotatably connected to a second wing set connecting rod 88 similar in function to first wing set connecting arm 54. A second slide connector 90 is fixedly connected to second upper sliding member 74 and, therefore, slides in unison with second upper sliding member 74 in either of the first or second wing movement directions "B", "C". A second flywheel connecting rod 92 is rotatably connected to second slide connector 90 at a first end and rotatably connected to a second flywheel 94 at a second end. Sliding motion of second slide connector 90, therefore, axially rotates second flywheel 94 which is connected using a second flywheel drive belt 96 to AC generator 64. A continuous motion of both the first and second wing assemblies 12, 14 using rotation of the individual first and second axis-vertical wings 18, 68 transfers this rotational energy from water flowing in inlet flow direction "A" to AC generator 64 for generation of electrical power.

The combination of first and second wing assemblies 12, 14 creates a wing mill assembly 98 which is supported at opposite ends using first and second ballast tanks 100, 102, each positioned proximate to one of the first or second multiple segment piers 36, 37. First and second ballast tanks 100, 102 provide the buoyancy required to lift wing mill assembly 98 in the rising direction "D", which permits wing mill assembly 98 to accommodate different water column heights, as previously identified herein.

Figure 2:
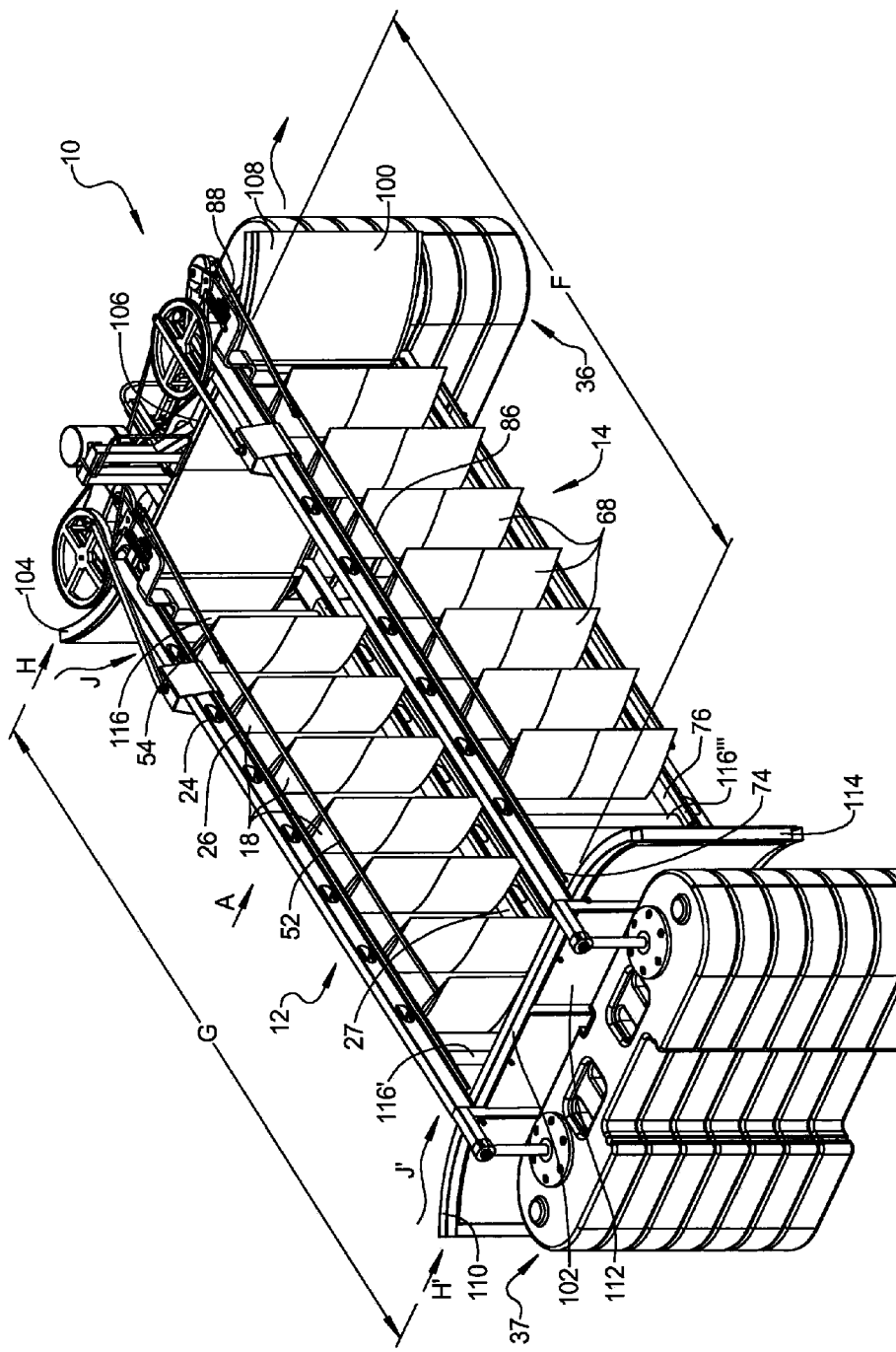
FIG. 2 is a top rear left perspective view of the hydrokinetic electrical generating device of FIG. 1.

Referring to FIG. 2, each of the first and second ballast tanks 100, 102 has curved inlet and outlet ends which accelerate the incoming flow of water in the inlet flow direction "A" in a flow throat "F", in accordance with the Bernoulli principle, by directing flow from a flow field "G" through flow throat "F", which is narrower than flow field "G", thereby increasing the velocity of flow in flow throat "F". This further increases the amount of flow force across each of the first and second axis-vertical wings 18, 68. Flow is diverted at the inlet end of hydrokinetic electrical generating device 10 by first curved portion 104 of first ballast tank 100 which is connected to a planar portion 106 transitioning to a second curved portion 108 at the discharge end of hydrokinetic electrical generating device 10. Similarly, a first curved portion 110 of second ballast tank 102 directs incoming water to a planar portion 112 defining flow throat "F" between planar portions 106, 112, followed by a second curved portion 114 which redirects flow exiting hydrokinetic electrical generating device 10. Exemplary water flow entering hydrokinetic electrical generating device 10 is shown by flow field flow paths "H", H' of flow field "G" which are redirected as shown by redirected flow paths "J", "J'" into the flow throat "F".

A plurality of support braces 116 are used to spatially separate and structurally support the upper and lower sliding members as follows. Support braces 116, 116' separate the first upper and first lower sliding members 26, 27. Support braces 116" (not clearly visible in this view) and support brace 116''' spatially separate the second upper and lower sliding members 74, 76.

Figure 3:
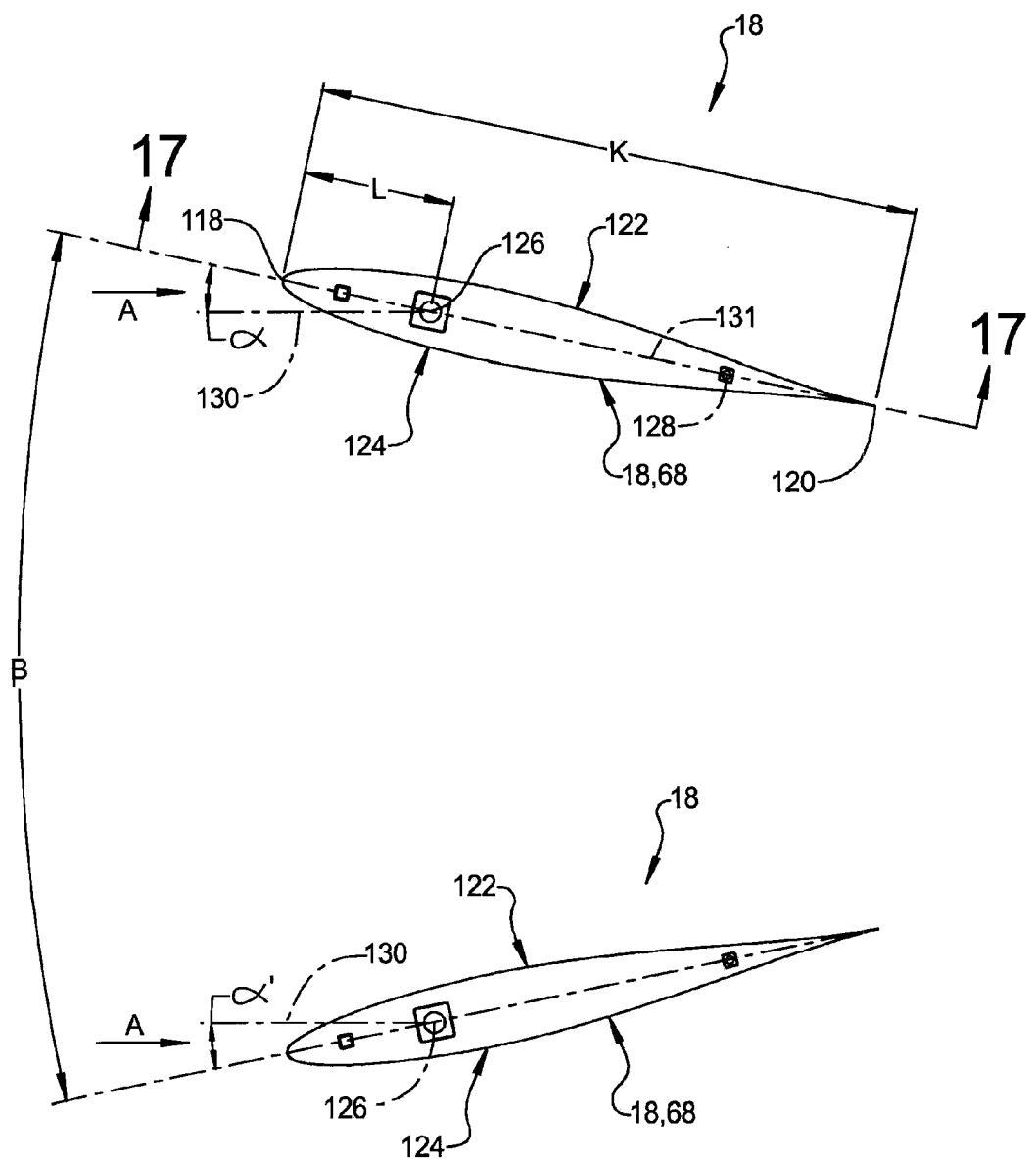
FIG. 3 is a top plan view of a wing of the present disclosure at opposed maximum angles of attack.

Referring to FIG. 3, an exemplary first axis-vertical wing 18 is depicted at opposite extremes of angle of attack α with respect to inlet flow direction "A". Each wing of hydrokinetic electrical generating device 10 includes a leading edge 118 and an opposite trailing edge 120. Opposed first and second wing surfaces 122, 124 define wetted surfaces which generate lift as the angle of attack α is changed with respect to a wing axis of rotation 126. Each of the wings has a wing cord length "K" and the wing axis of rotation 126 is spatially separated along the cord length at an axis of rotation spacing dimension "L" with respect to the leading edge 118. According to several embodiments, axis of rotation spacing dimension "L" is positioned at approximately 25% of the wing cord length "K" from leading edge 118. A wing spacing axis 128 is created proximate the trailing edge 120, which is the rotatable connection point for first and second wing set control arms 52, 86 previously discussed with reference to FIG. 1. According to several embodiments, angle of attack α ranges between approximately 0-15 degrees to optimize the lift generated by the wings, providing a total angular range of motion β of approximately 30 degrees. The maximum angle of attack α and the total angular range of motion β can also be greater or less than the values provided above at the discretion of the manufacturer, and depend on the anticipated flow velocity of the water flow field, the size of the axis-vertical wings selected, the quantity and spacing of the axis-vertical wings, and the number of wing assemblies.

Figure 4:
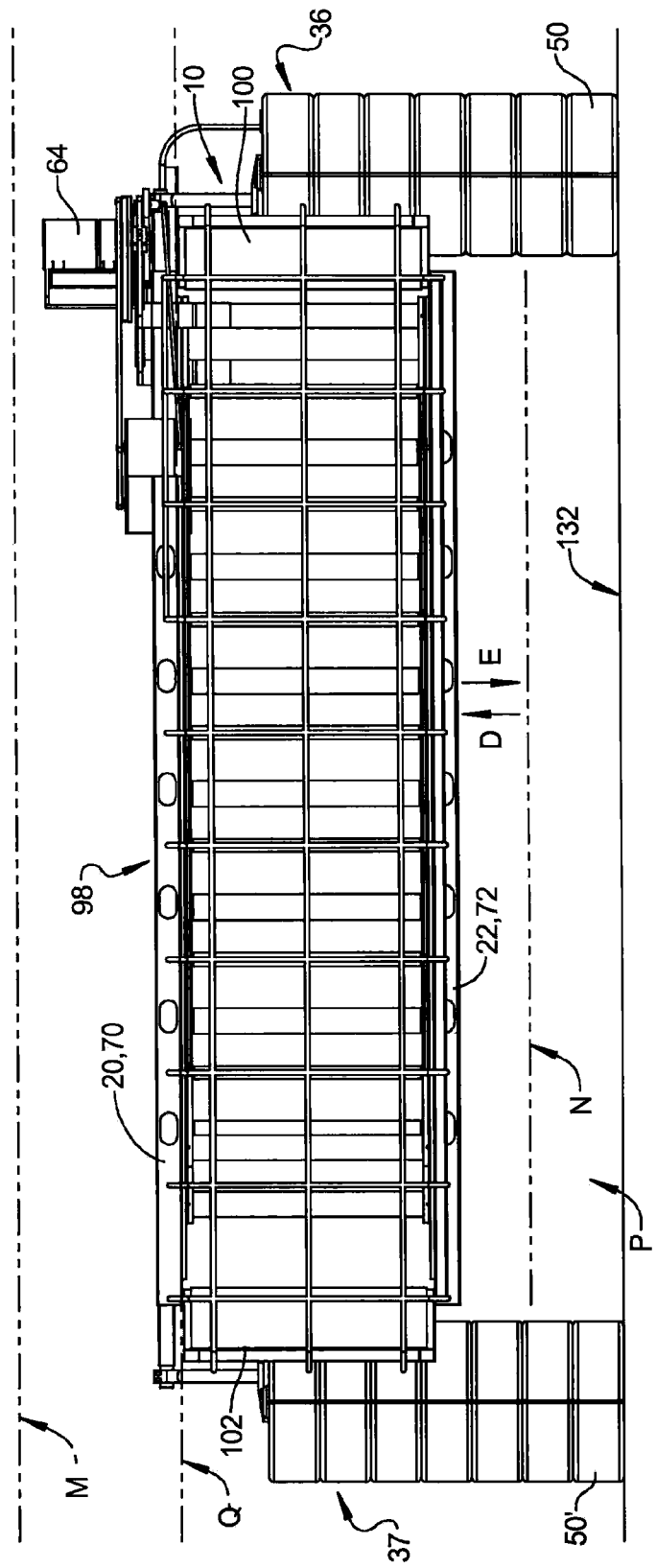
FIG. 4 is a rear elevational view of the hydrokinetic electrical generating device of FIG. 1.

Referring to FIG. 4, as previously noted, first and second ballast tanks 100, 102 allow wing mill assembly 98 to move in either the rising direction "D" or lowering direction "E", depending on a height of the water column above a bed 132, such as a river or canal bed or tidal basin bed. The lowermost pier segment of the first and second multiple segment piers 36, 37 contacts and can be anchored with respect to bed 132.

The quantity of pier segments can vary to permit wing mill assembly 98 to operate between a water surface "M", which completely submerges wing mill assembly 98, to a minimum assembly height "N" above bed 132, which maintains a minimum clearance space "P" between first and second lower wing support beams 22, 72 and bed 132. Minimum clearance space "P" is provided to permit materials, such as debris, a clear path below wing mill assembly 98, which reduces the potential for materials clogging the individual wings. In addition, it has been found that approximately 80% of the energy available from the water flowing in a river or stream is located in the top 50% of the water column. It is therefore desirable to keep wing mill assembly 98 as high in the water column as possible to take full advantage of the maximum velocity water flowing at the upper column areas. A minimum water surface height "Q", which maintains wetted surface areas of the entire first and second wing assemblies 12, 14, can be predetermined to calculate the quantity of pier segments used for first and second multiple segment piers 36, 37 to maintain minimum clearance space "P".

Figure 5:
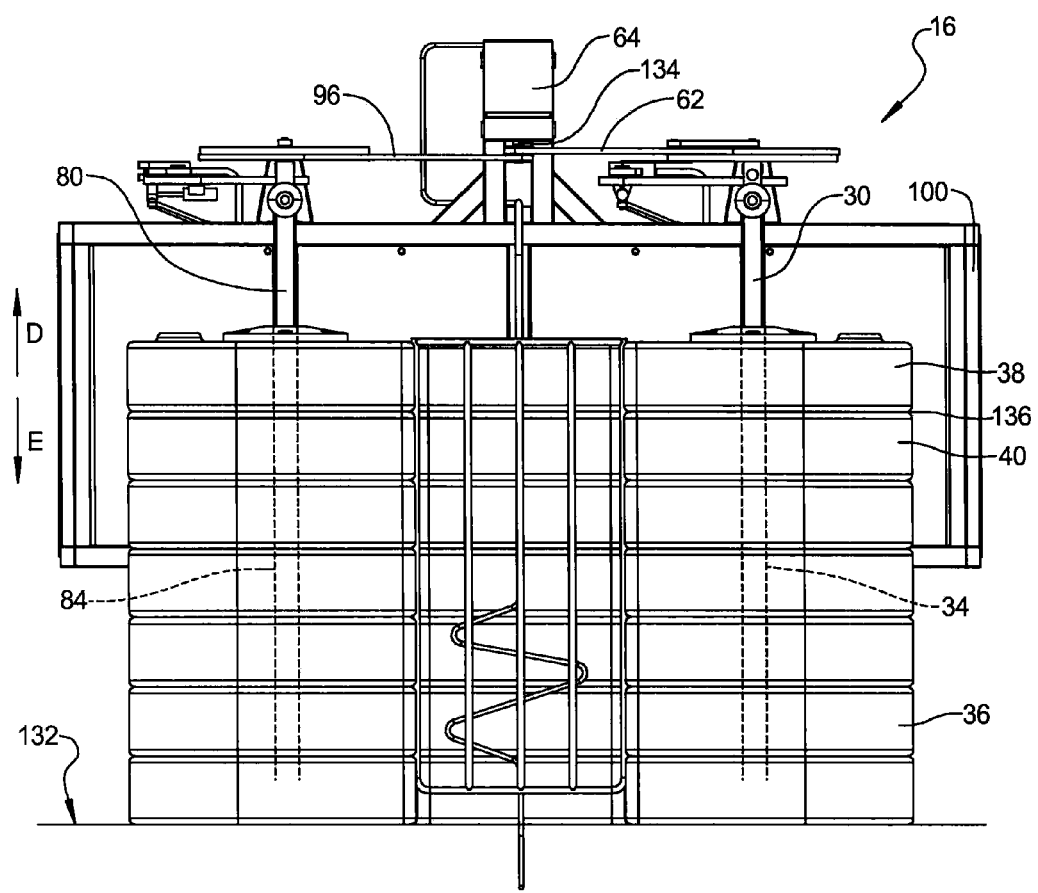
FIG. 5 is a side elevational view of the hydrokinetic electrical generating device of FIG. 1.

Referring to FIG. 5, AC generator 64 is positioned substantially centrally between first support shaft 30 and third support shaft 80 such that the lengths of first and second flywheel drive belts 62, 96 can be maintained substantially equivalent. A generator pulley assembly 134, connected to AC generator 64, provides pulley wheels for connection to each of the first and second flywheel drive belts 62, 96. The support shaft cylinders 34, 84, which slidably receive first and third support shafts 30, 80, are positioned substantially within first multiple segment pier 36, as shown. A similar configuration for second multiple segment pier 37 is also provided. A connection joint 136 is defined between proximate ones of the pier segments of the first and second multiple segment piers 36, 37. Connection joint 136 can be sealed at the discretion of the installer or retained as a face-to-face joint between pier segments, such as between first and second pier segments 38, 40. The amount of total vertical displacement of the ballast tanks, such as first ballast tank 100, is controlled by the length of support shaft cylinders 34, 84 and, therefore, the length of first and third support shafts 30, 80 slidably received therein.

Figure 6:
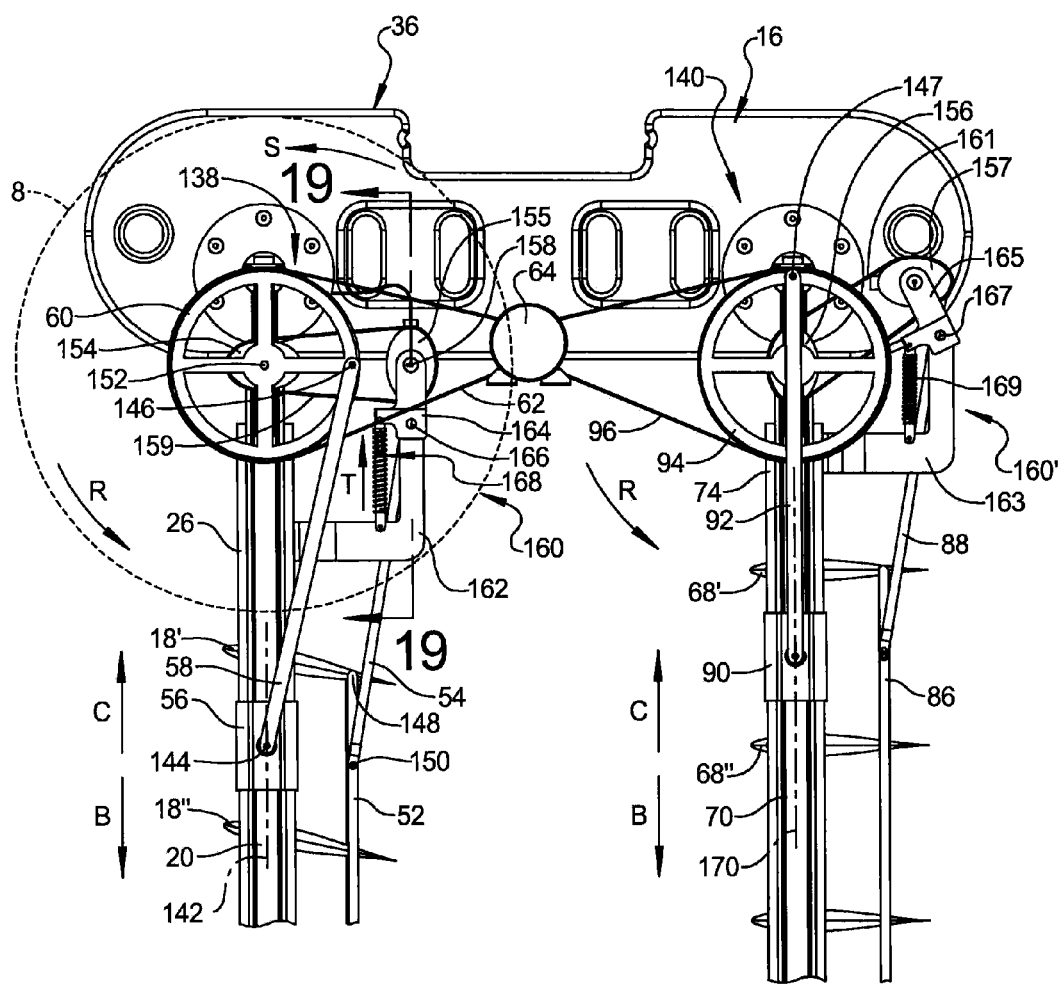
FIG. 6 is a top plan view of the mechanical-electrical section of the hydrokinetic electrical generating device of FIG. 1.

Referring to FIG. 6, mechanical-electrical section 16 includes each of a first and second operator portion 138, 140. Each of the first and second operator portions corresponds to one of the first and second wing assemblies 12, 14, respectively. First operator portion 138 provides for connection of first slide connector 56 which is movable with respect to a first sliding member longitudinal axis 142 of first upper wing support beam 20. A rotational fastener 144 rotatably joins first slide connector 56 to first flywheel connecting rod 58. At a second end of first flywheel connecting rod 58, a rotational pin 146 rotatably connects first flywheel connecting rod 58 to first flywheel 60. The sliding motion of first slide connector 56 in either of the first or second wing movement directions "B", "C" is phased to cause a counterclockwise rotation "R" of first flywheel 60. Each of the first axis-vertical wings 18, such as axis-vertical wing 18', is connected to first wing set control arm 52 using rotational fasteners 148. A spacing dimension between the rotational fasteners 148 is held constant to maintain each of the first axis-vertical wings 18 parallel to each other.

First wing set control arm 52 is rotatably connected to first wing set connecting arm 54 using a rotational fastener 150. First flywheel 60 is rotatably supported using a rotational shaft 152 which is also received through a first elliptical member 154. First elliptical member 154 co-rotates with first flywheel 60. A second elliptical member 155 is spatially separated from first elliptical member 154 and is rotatably mounted using a rotational fastener 158. A first elliptical member drive belt 159 is coupled to first and second elliptical members 154, 155. Rotation of first flywheel 60 causes co-rotation of first elliptical member 154 and further via first elliptical member drive belt 159 causes simultaneous rotation of second elliptical member 155. Co-rotation is herein defined as a rotation of connected items about a common axis of rotation such that each degree of incremental rotation of a first one of the items such as first flywheel 60 results in an equal degree of incremental rotation of a second one of the items, such as first elliptical member 154 about the common axis of rotation.

A wing orientation control device 160 includes an L-shaped arm 162 fixedly connected to first upper sliding member 26. Wing orientation control device 160 therefore moves in either of the first or second wing movement directions "B", "C" together with first slide connector 56. Wing orientation control device 160 further includes an elliptical member connecting mount 164 rotatably connected to L-shaped arm 162 using a rotational fastener 166, and a force dampening assembly 168 connected between L-shaped arm 162 and an extending member of rotational fastener 166. Second elliptical member 155 is rotatably connected to elliptical member connecting mount 164. Rotation of the first and second elliptical members 154, 155 causes a counterclockwise rotation of elliptical member connecting mount 164 about rotational fastener 166, as viewed in FIG. 6. Force dampening assembly 168 is provided to dampen and resist this rotational movement and help return elliptical member connecting mount 164 to the position shown in FIG. 6. First wing set connecting arm 54 is also connected to elliptical member connecting mount 164, which is shown and described in better detail in reference to FIG. 19. The counterclockwise rotation of first flywheel 60 in the counterclockwise direction of rotation "R" causes simultaneous rotation of first and second elliptical members 154, 155 as well as rotation of elliptical member connecting mount 164.

Second operator portion 140 of mechanical-electrical section 16 includes components that are substantially identical to first operator portion 138, including use of a second wing orientation control device 160'. Second slide connector 90 is slidably disposed with respect to a second sliding member longitudinal axis 170 of second upper wing support beam 70. Sliding motion of second slide connector 90 in either of the first or second wing movement directions "B", "C" translates second flywheel connecting rod 92 similar to the translational motion of first flywheel connecting rod 58, thereby causing counterclockwise rotation in the counterclockwise direction of rotation "R" of second flywheel 94. A rotational pin 147 connecting second flywheel connecting rod 92 to second flywheel 94 is shown rotated counterclockwise approximately 90 degrees from the rotational position of rotational pin 146.

This 90 degree difference between the rotational pins 146, 147 connecting positions of first and second flywheels 60, 94 maintains the second axis-vertical wings 68 out of rotational phase with respect to first axis-vertical wings 18. With rotational pin 147 positioned at a twelve o'clock position and rotational pin 146 positioned at a 3 o'clock position as shown in FIG. 6, an L-shaped arm 163 of second wing orientation control device 160' is positioned in its furthest translated position with respect to the second wing movement direction "C". Second elliptical member 155 is rotated approximately 90 degrees with respect to first elliptical member 154. A third elliptical member 156 which is co-rotatable with second flywheel 94 is rotated approximately 90 degrees from the orientation of first elliptical member 154, and a fourth elliptical member 157 is rotated approximately 90 degrees about its axis of rotation with respect to the angular rotation of third elliptical member 156 about its axis of rotation. Fourth elliptical member 157 is connected for rotation to third elliptical member 156 using a second elliptical member drive belt 161 which functions the same as first elliptical member drive belt 159. An elliptical member connecting mount 165 is shown at its furthest rotated position in the counterclockwise direction with respect to the position shown for elliptical member connecting mount 164. By keeping the first and second axis-vertical wings 18, 68 out of phase with each other, a water induced force acting on either first axis-vertical wings 18 or second axis-vertical wings 68 is always available to provide the operating force required to maintain side-to-side motion of the first and second wing assemblies 12, 14 in first or second wing movement directions "B" or "C" and therefore to maintain rotation of the first and second flywheels 60, 94.

As previously noted, rotation of first flywheel 60 rotatably displaces first flywheel drive belt 62 connected to AC generator 64, and rotation of second flywheel 94 similarly causes rotation of second flywheel drive belt 96, also connected to AC generator 64. A continuous rotation of AC generator 64 is thereby accomplished by the phased configuration of first and second wing assemblies 12, 14. Second elliptical member 155 rotates in a counterclockwise direction of rotation "S" about rotational fastener 158. Fourth elliptical member 157 rotates similarly to second elliptical member 155. As elliptical member connecting mount 164 rotates with respect to rotational fastener 166, the force dampening assembly 168 generates a returning force "T" working to return the elliptical member connecting mount 164 to the position shown. A force dampening assembly 169, which is identical to force dampening assembly 168, is connected to L-shaped arm 163 and elliptical member connecting mount 165, and is shown in its rotated and spring-compressed condition.

Figure 7:
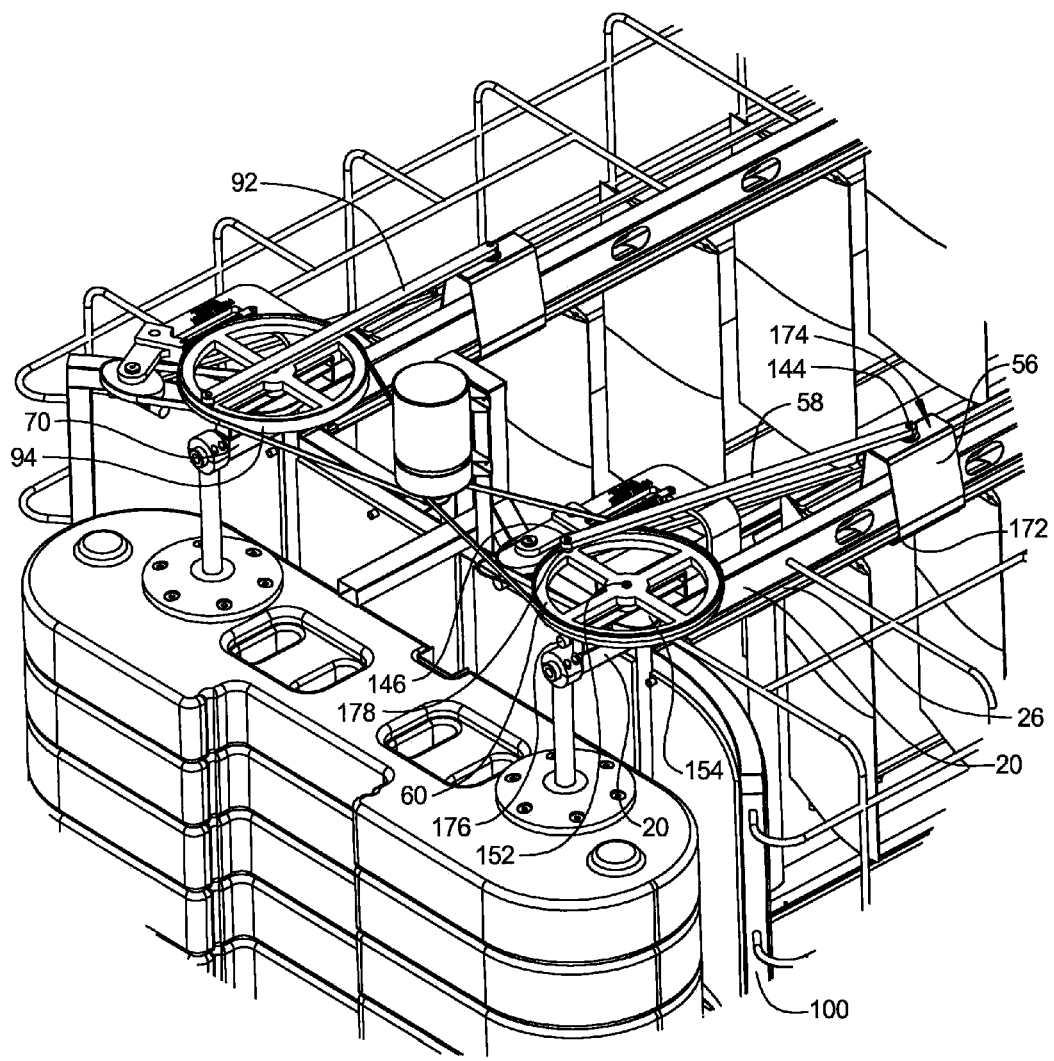
FIG. 7 is a top front right perspective view of the mechanical-electrical section of FIG. 6.

Referring to FIG. 7, first slide connector 56 includes a connection flange 172 used to fixedly connect first slide connector 56 to first upper sliding member 26. The rotational fastener 144, used to rotatably connect first slide connector 56 to first flywheel connecting rod 58, spaces the first flywheel connecting rod 58 above an upper surface 174 of first slide connector 56 so that first flywheel connecting rod 58 can be oriented substantially horizontal at its connection with first flywheel 60. Rotational shaft 152, which permits rotation of both first flywheel 60 and first elliptical member 154, is connected to a shaft connection structure 176 fixed to first upper wing support beam 20. A spacer 178 can be used at the connection between first flywheel connecting rod 58 and first flywheel 60 to further ensure that first flywheel connecting rod 58 is oriented substantially horizontal. Second flywheel connecting rod 92 is similarly connected to second flywheel 94 and supported by second upper wing support beam 70.

Figure 8:
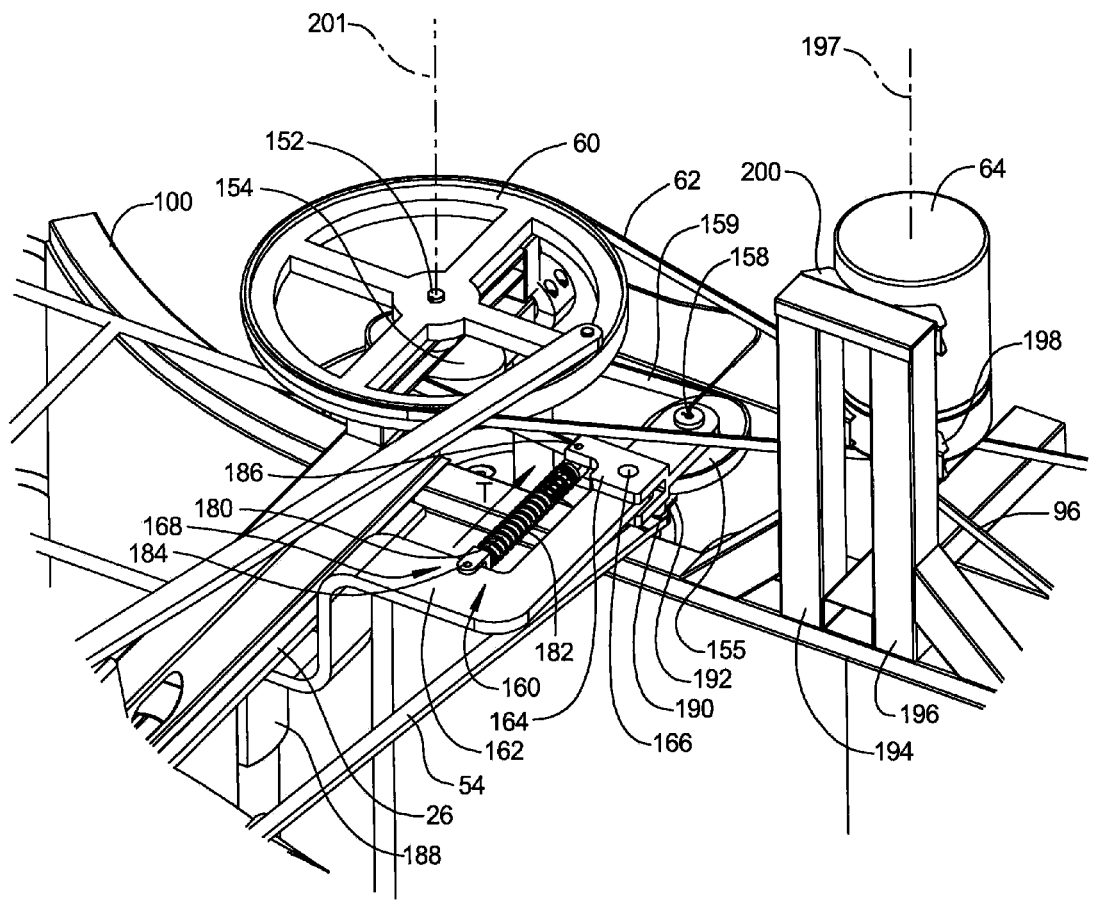
FIG. 8 is a top rear left perspective view of the mechanical-electrical section of FIG. 6.

Referring to FIG. 8 and again to FIG. 6, each of the force dampening assemblies 168, 169 include a shock absorber 180 having an externally mounted compression spring 182 generating the returning force "T". Force dampening assembly 168 is connected using a rotational fastener 184 to L-shaped arm 162 and using a rotational fastener 186 to elliptical member connecting mount 164. It is noted that first elliptical member 154 is oriented approximately 90 degrees with respect to second elliptical member 155 at all times. This difference in rotational phase, as previously noted, helps to maintain continuous rotation of the flywheels.

L-shaped arm 162 further includes an arm connecting end 188 which is fixedly connected to first upper sliding member 26. A rotational pin 190 is slidable with respect to second elliptical member 155 and is used to rotatably connect first wing set connecting arm 54 to a sliding structure 192 which is slidably connected to second elliptical member 155. Displacement of first wing set connecting arm 54 which collectively rotates all of the first axis-vertical wings 18 is caused by rotation of second elliptical member 155, which in turn is rotated by its connection via elliptical member drive belt 159 as first flywheel 60 rotates.

AC generator 64 can be connected to structure of first ballast tank 100 using a first stanchion 194 and a second stanchion 196. First and second brackets 198, 200 connected to first and second stanchions 194, 196 are used to mount AC generator 64. First and second brackets 198, 200 maintain parallel alignment between a generator longitudinal axis 197 and a shaft longitudinal axis 201 of rotational shaft 152 and a similar rotational shaft 152' of second flywheel 94 (not shown in this view).

Figure 9:
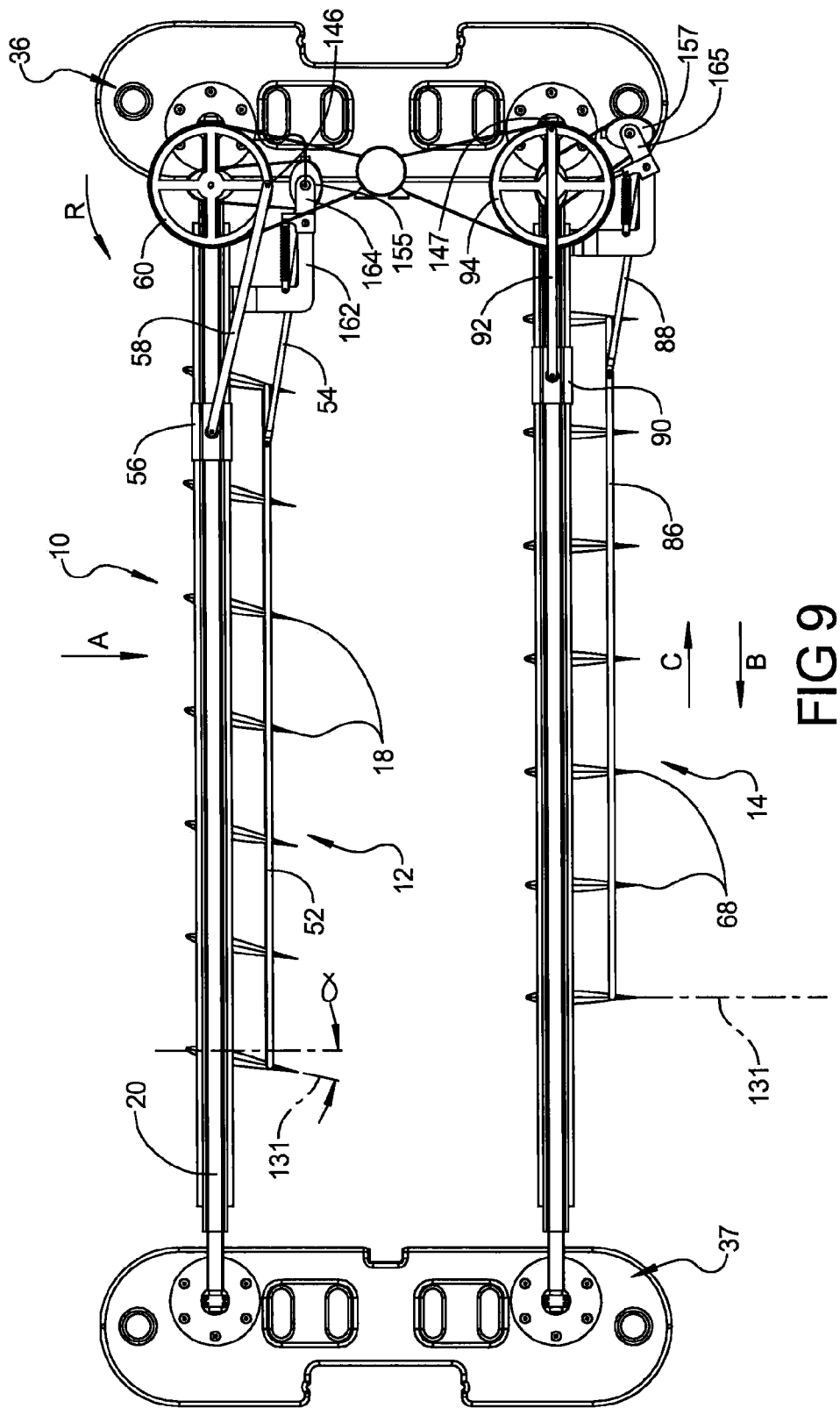
FIG. 9 is a top plan view of the hydrokinetic electrical generating device of FIG. 1 at a first operating position of the wing assemblies.

Referring to FIGS. 9-12, a standard cycle of operation for each of the first and second wing assemblies 12, 14 are demonstrated. Referring specifically to FIG. 9, second axis-vertical wings 68 of second wing assembly 14 are positioned at the furthest extent of travel in the second wing movement direction "C". This results in the rotational pin 146' being at the twelve o'clock position of second flywheel 94, as previously described in reference to FIG. 6. There is substantially zero lift force being generated by second axis-vertical wings 68 at this position because the cord axis 131 of second axis-vertical wings 68 is substantially parallel to inlet flow direction "A". In contrast, each of the first axis-vertical wings 18 of first wing assembly 12 is oriented at a maximum angle of attack α having their cord axes 131 oriented approximately 15 degrees with respect to inlet flow direction "A". The force being generated by first axis-vertical wings 18 is acting in the second wing movement direction "C", tending to rotate rotational pin 146 away from the three o'clock position, with respect to first flywheel 60, and toward the twelve o'clock position. Further rotation of first axis-vertical wings 18 in the second wing movement direction "C" will also tend to move rotational pin 147 away from the twelve o'clock position shown to initiate travel of second axis-vertical wings 68 in the first wing movement direction "B".

Figure 10:
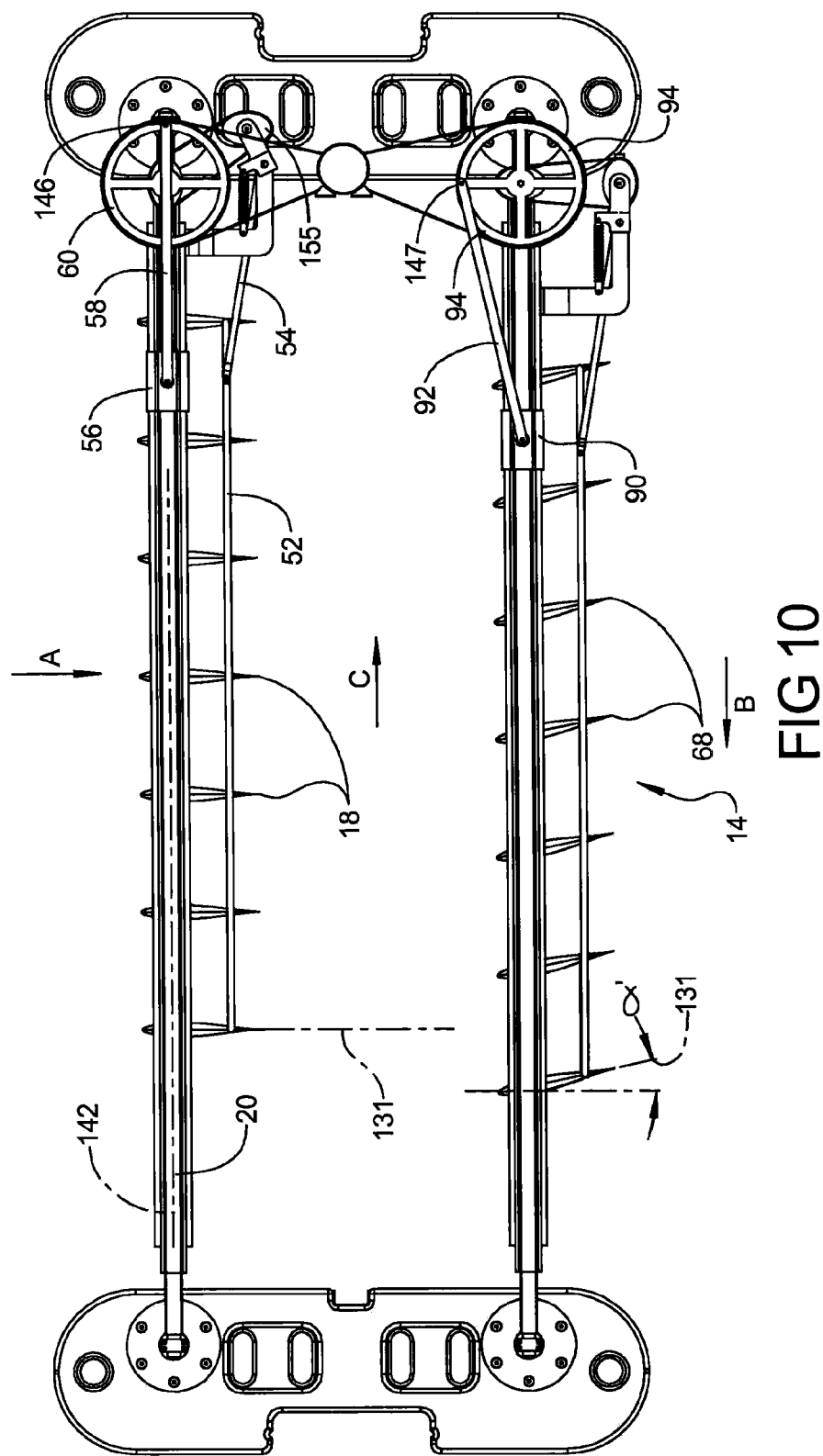
FIG. 10 is a top plan view of the hydrokinetic electrical generating device of FIG. 1 at a second operating position of the wing assemblies.

With specific reference to FIG. 10, first axis-vertical wings 18 have reached their furthest extent of travel in the second wing movement direction "C" positioning rotational pin 146 at the twelve o'clock position with respect to first flywheel 60. The cord axis 131 of each of the first axis-vertical wings 18 is substantially parallel to inlet flow direction "A" therefore each of the first axis-vertical wings 18 is producing no lift or force. At this position, first flywheel connecting rod 58 is aligned substantially co-axial with first sliding member longitudinal axis 142. Each of the second axis-vertical wings 68 is oriented at a maximum angle of attack α' having the cord axis 131 of each of the second axis-vertical wings 68 rotated to approximately 15 degrees with respect to inlet flow direction "A". This positions rotational pin 147 at the nine o'clock position with respect to second flywheel 94. The lift or horizontal force generated by each of the second axis-vertical wings 68 is directed in the first wing movement direction "B", which tends to pull second wing assembly 14 in the first wing movement direction "B".

Figure 11:
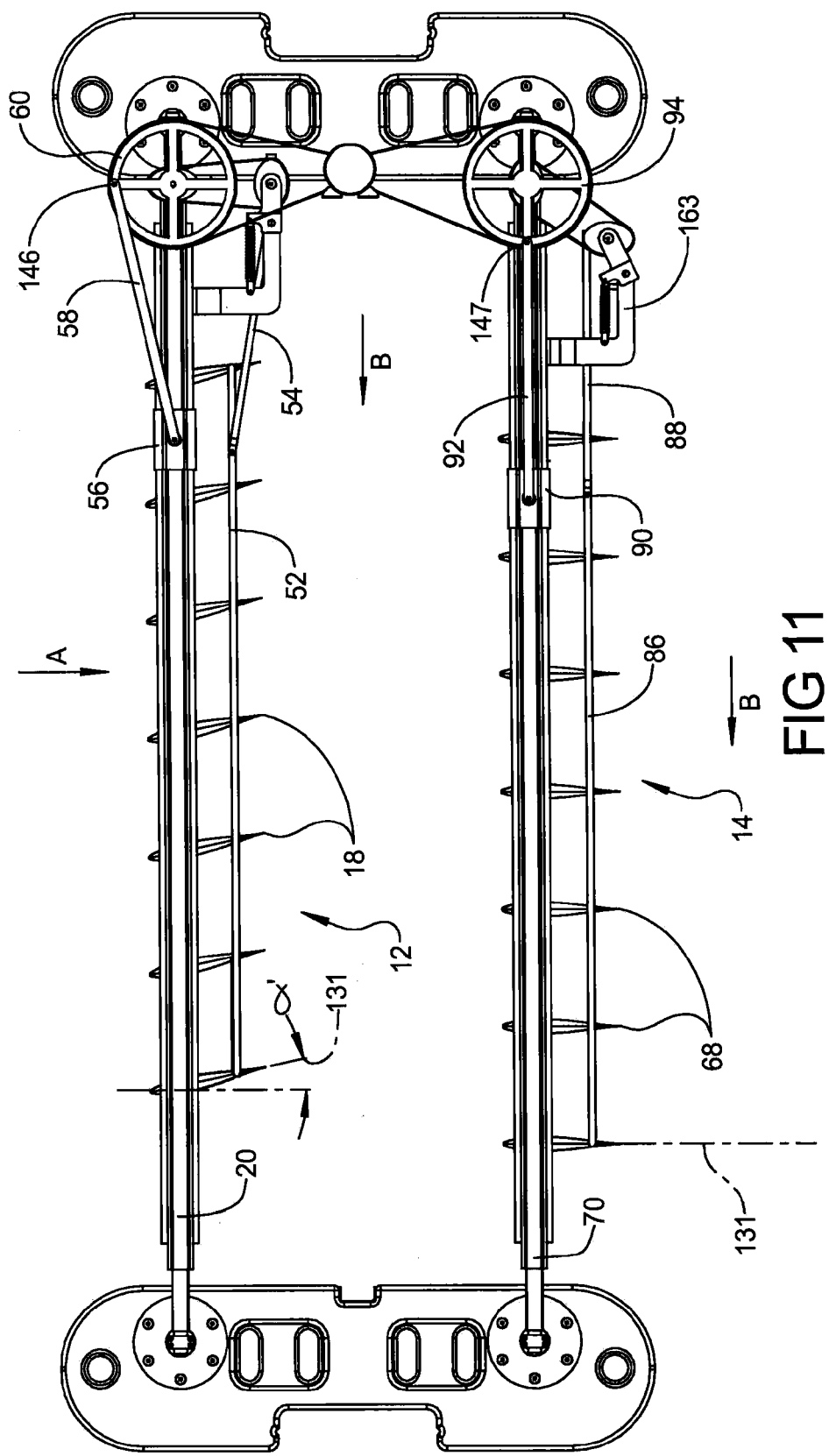
FIG. 11 is a top plan view of the hydrokinetic electrical generating device of FIG. 1 at a third operating position of the wing assemblies.

Referring to FIG. 11, the second axis-vertical wings 68 have each reached their furthest extended position in the first wing movement direction "B". This positions rotational pin 147 at the six o'clock position with respect to second flywheel 94 and orients each of the second axis-vertical wings 68 such that the cord axis 131 of each is substantially parallel to inlet flow direction "A", thereby generating no force by any of the second axis-vertical wings 68. Each of the first axis-vertical wings 18 is now positioned at a maximum angle of attack α' having its cord axis 131 oriented at approximately fifteen degrees with respect to the inlet flow direction "A", thereby generating maximum force or lift from each of the first axis-vertical wings 18. The direction of the force generated by the first axis-vertical wings 18 at this time is in the first wing movement direction "B". This will tend to further pull the rotational pin 146, with respect to first flywheel 60, from the nine o'clock position shown toward the six o'clock position.

Figure 12:
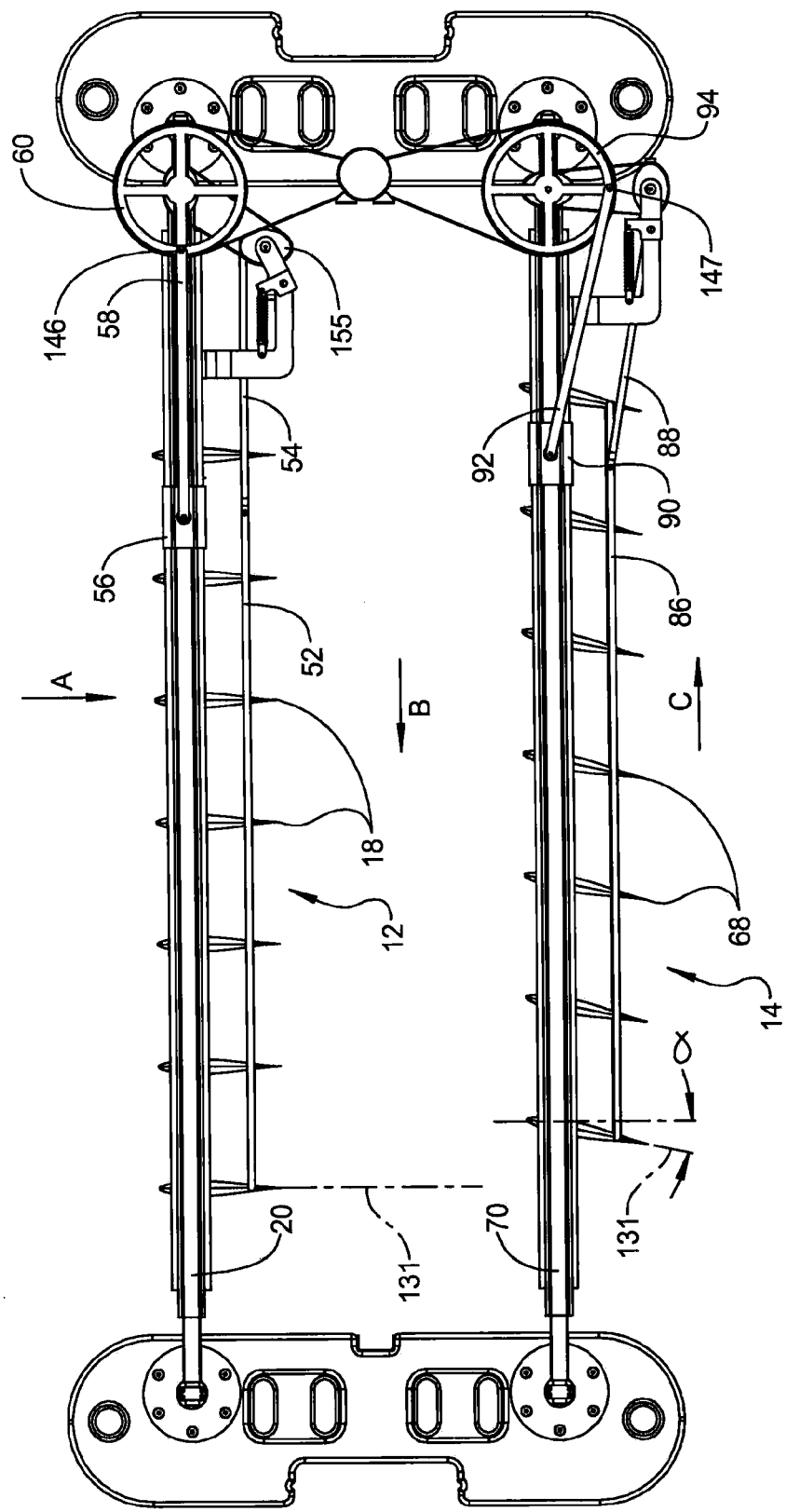
FIG. 12 is a top plan view of the hydrokinetic electrical generating device of FIG. 1 at a fourth operating position of the wing assemblies.

Referring now to FIG. 12, each of the first axis-vertical wings 18 has reached its furthest extent in the first wing movement direction "B", thereby positioning rotational pin 146 at the six o'clock position with respect to first flywheel 60. At this position, none of the first axis-vertical wings 18 are generating any lift or force because their cord axes 131 are each oriented substantially parallel to the inlet flow direction "A". Each of the second axis-vertical wings 68 is oriented at angle of attack α having its cord axis 131 positioned approximately fifteen degrees with respect to the inlet flow direction "A". The force generated by each of the second axis-vertical wings 68 is, therefore, in the second wing movement direction "C". This positions rotational pin 147 at the three o'clock position with respect to second flywheel 94.

Figure 13:
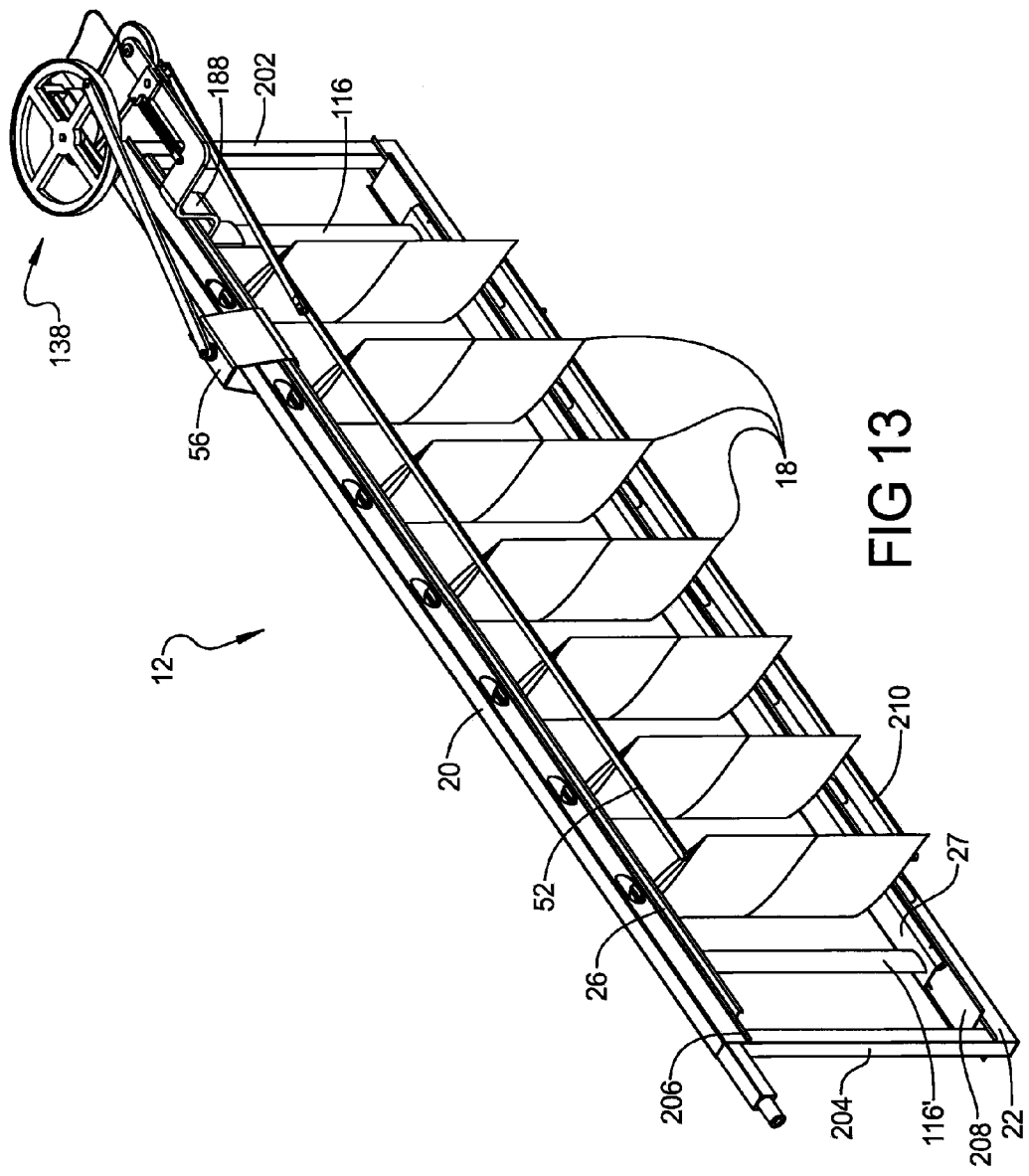
FIG. 13 is a top left perspective view of a first wing assembly of the hydrokinetic electrical generating device of FIG. 1.

Referring to FIG. 13, because each of the first and second wing assemblies 12, 14 is substantially identical in construction, the following discussion referring to first wing assembly 12 applies equally to second wing assembly 14. A first vertical frame member 202 and a second vertical frame member 204 are connected at opposite ends of first upper wing support beam 20 and are oriented substantially transverse to first upper wing support beam 20 and first lower wing support beam 22. First and second vertical frame members 202, 204 are each fixedly connected to first upper and first lower wing support beams 20, 22. An upper platen 206 can be connected to an underside of first upper wing support beam 20. Similarly, a lower platen 208 can be fixedly connected to an upwardly directed face of first lower wing support beam 22. First upper sliding member 26 is slidably received by upper platen 206 and first lower sliding member 27 is slidably received by lower platen 208. The support braces 116, 116' are fixedly connected between first upper and first lower sliding members 26, 27 at opposite ends of the first upper and first lower sliding members 26, 27. Each of the first axis-vertical wings 18 are rotatably connected to the first upper and first lower sliding members 26, 27. The first wing set control arm 52 is then rotatably connected to each of the first axis-vertical wings 18. In addition, a first wing set lower control arm 210 can be rotatably connected at a lower end of each of the first axis-vertical wings 18. The use of both first wing set control arm 52 and first wing set lower control arm 210 maintains the parallel configuration of each of the first axis-vertical wings 18 and prevents twisting motion of the wings. The first operator portion 138 is then connected to first upper wing support beam 20, as previously described, having both first slide connector 56 and arm connecting end 188 fixedly connected to first upper sliding member 26.

Figure 14:
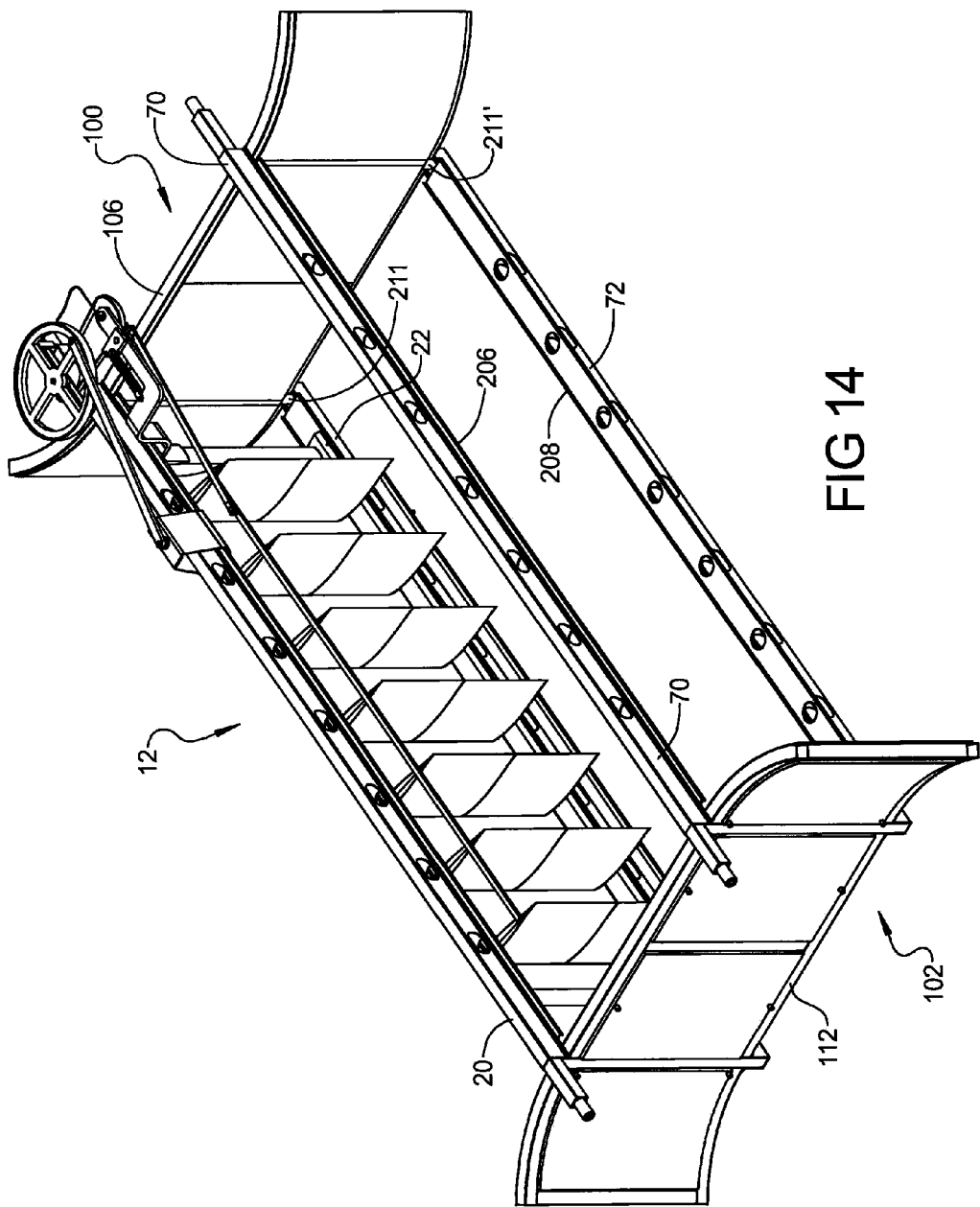
FIG. 14 is a top left perspective view showing connection of the first wing assembly of FIG. 13 to the ballast tanks and further showing structural beams of a second wing assembly.

Referring to FIG. 14, first and second wing assemblies 12, 14 are connected to the first and second ballast tanks 100, 102 using pins connected to planar portion 106 and planar portion 112 of first and second ballast tanks 100, 102, respectively. Connecting pins 211, 211' are used, for example, at the joints between first lower wing support beam 22 and second lower wing support beam 72 and opposed corners of planar portion 106 of first ballast tank 100. Similar connecting pin joints are created at the upper portions of planar portion 106 as well as at each of the corners of planar portion 112 of second ballast tank 102. First and second upper wing support beams 20, 70 are, thereby supported with respect to the upper surfaces of planar portions 106, 112.

Figure 15:
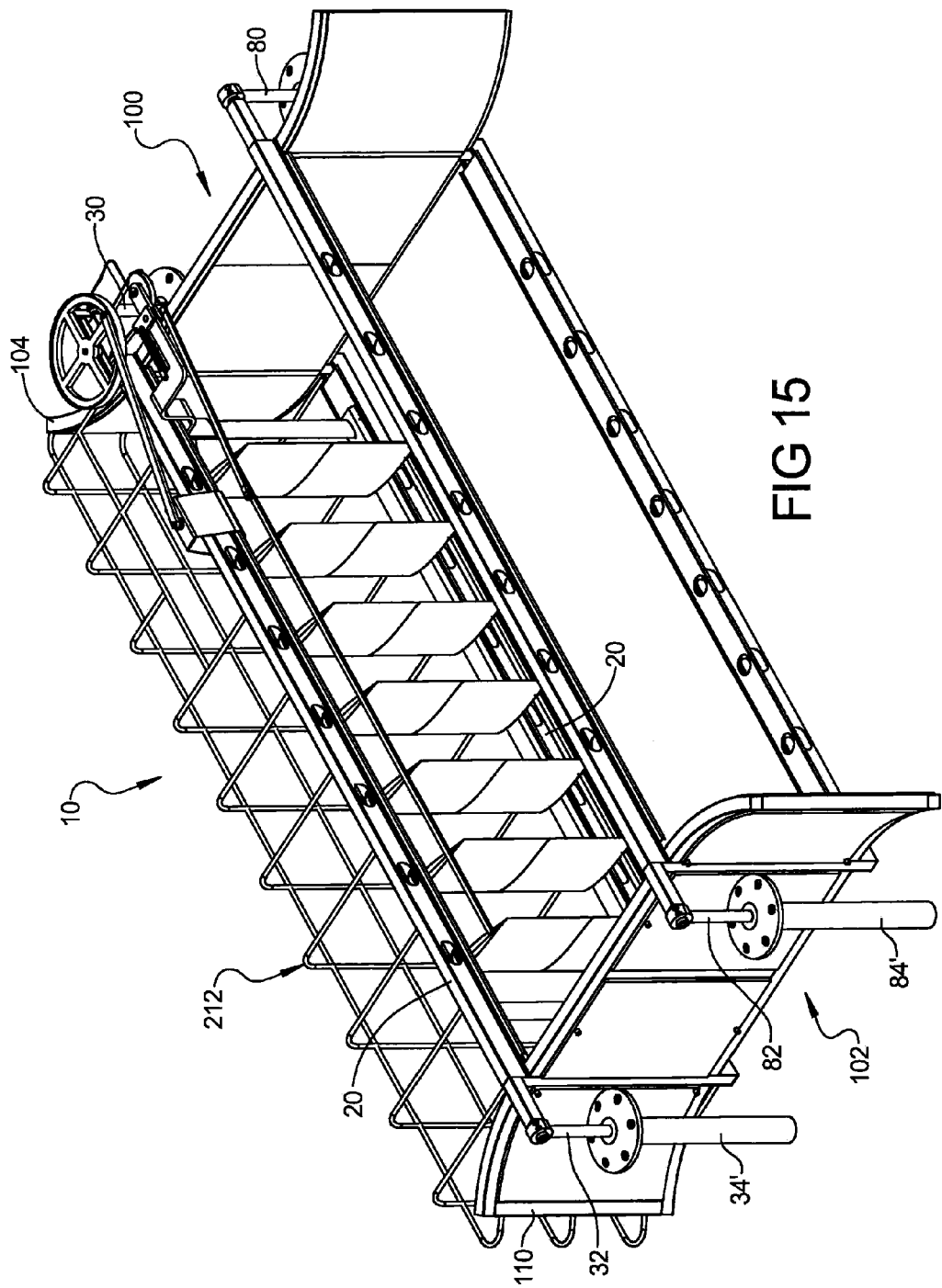
FIG. 15 is the top left perspective view of FIG. 14 further showing installation of an inlet debris screen and support shaft cylinders.

Referring to FIG. 15, in order to prevent large debris such as floating tree branches and the like from interfering with operation of hydrokinetic electrical generating device 10, debris screens can be provided at both inlet and downstream ends of hydrokinetic electrical generating device 10. These can include an inlet debris screen 212, which is connected to first curved portions 104, 110 of first and second ballast tanks 100, 102, as well as to first upper and lower wing support beams 20, 22. Inlet debris screen 212 can be connected by fastening or, for example, by permanently connecting via a welding process.

Figure 16:
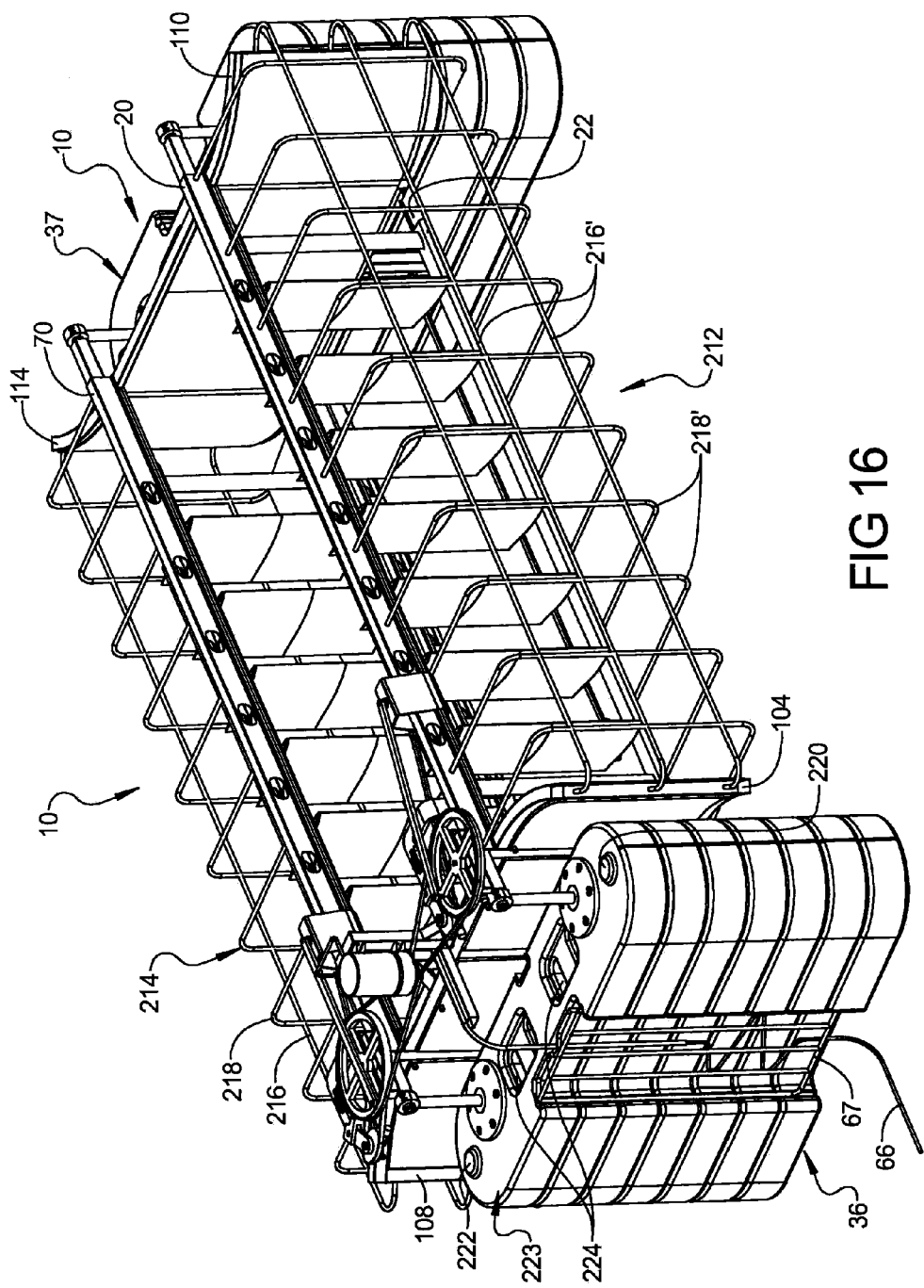
FIG. 16 is a top front right perspective view of the hydrokinetic electrical generating device of FIG. 1 further showing installation of both the inlet and an outlet debris screens

Referring to FIG. 16, in addition to inlet debris screen 212, a substantially identical outlet debris screen 214 can be connected to the outlet side of hydrokinetic electrical generating device 10. Each of the inlet and outlet debris screens 212, 214 include a plurality of horizontal first rod members 216, 216' and a plurality of second rod members 218, 218', respectively, oriented substantially perpendicular to horizontal first rod members 216, 216'. First and second rod members 216, 218 and 216', 218' can be welded to each other as well as to the first and second ballast tanks 100, 102. A spacing between first and second rod members 216, 218 and 216', 218' can be selected based on the spacing between any two of the wings of first or second wing assemblies 12, 14 such that debris entering between the first and second rod members 216, 218 and 216', 218' should be able to freely pass between adjacent wings.

As further shown in FIG. 16, each of the first and second multiple segment piers 36, 37 includes first and second male alignment members 220, 222 extending on an upward facing surface 223 of each of the individual pier segments. The first and second male alignment members 220, 222 are aligned with and correspond to mating female apertures (not shown) on the underside surfaces of each of the pier segments. Engagement of the first and second male alignment members 220, 222 between adjacent pier segments, therefore, horizontally locks the pier segments together, preventing horizontal displacement between individual pier segments. At least one, and according to several embodiments a plurality, of ballast inlet ports 224 is also provided through each of the pier segments. Ballast inlet ports 224 can be used to permit inlet water flow using the weight of water as additional mass for the first and second multiple segment piers 36, 37. Alternately, a denser material, such as concrete, can be poured into ballast inlet ports 224 and allowed to set, which subsequently locks the individual pier segments together in addition to adding increased mass to the first and second multiple segment piers 36, 37.

Figure 17:
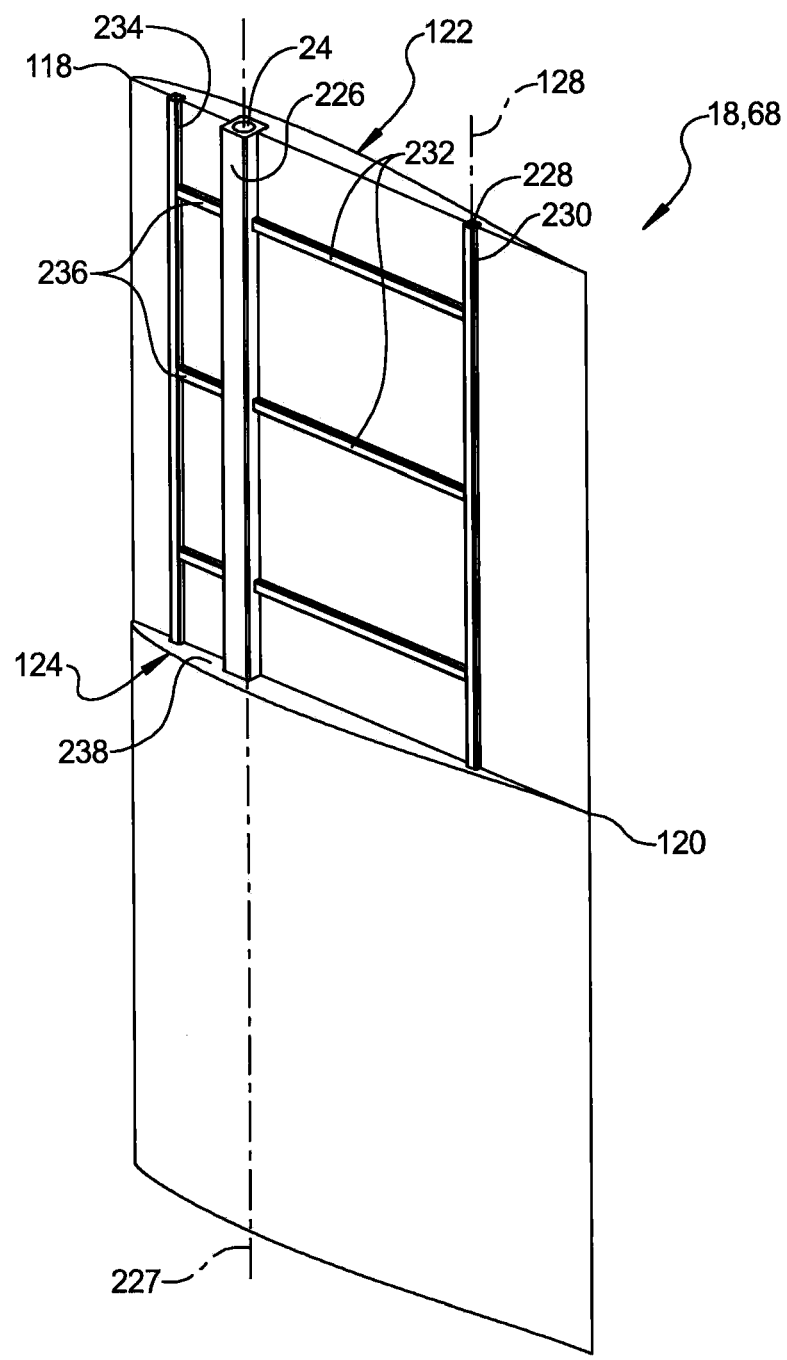
FIG. 17 is a partial cross sectional perspective view at section 17 of FIG. 3.

Referring to FIG. 17 and again to FIGS. 1 and 4, a common geometry of each of the first and second axis-vertical wings 18, 68 is shown. Pivot rod 24, which extends throughout a total height of the wing, is rotatably received within a pivot rod containment member 226. A longitudinal axis 227 of pivot rod 24 is oriented perpendicular to the first upper and lower wing support beams 20, 22 and the second upper and lower wing support beams 70, 72. Longitudinal axis 227 defines the rotational axis for each of the first and second axis-vertical wings 18, 68. Longitudinal axis 227 is therefore oriented substantially vertical in the installed position of hydrokinetic electrical generating device 10 with respect to the bed 132 supporting hydrokinetic electrical generating device 10. The vertical orientation of longitudinal axis 227 therefore defines the "axis-vertical" condition of first and second axis-vertical wings 18, 68 as referred to herein.

A wing spacing shaft 228 is rotatably disposed within a shaft containment member 230 proximate the trailing edge 120 of each wing. A plurality of first stiffener members 232 is fixed to pivot rod containment member 226 and shaft containment member 230. To provide additional rigidity proximate the leading edge 118, a leading edge member 234 is positioned parallel to both pivot rod containment member 226 and shaft containment member 230. A plurality of second stiffener members 236 is fixedly attached to each of leading edge member 234 and pivot rod containment member 226. According to several embodiments, each individual second stiffener member 236 co-axially aligns with one of the first stiffener members 232. Between the first and second wing surfaces 122, 124 and, therefore, substantially enclosing all of the interior members of the wing is injected a polymeric foam 238. According to several embodiments, polymeric foam 238 can be an expanded polypropylene (EPP) material. According to additional embodiments, the material of first and second wing surfaces 122, 124 can be a thermoplastic polyolefin (TPO) material. Material used for the inner support and stiffener members of first and second axis-vertical wings 18, 68 can be a metal, such as aluminum, or steel.

Figure 18:
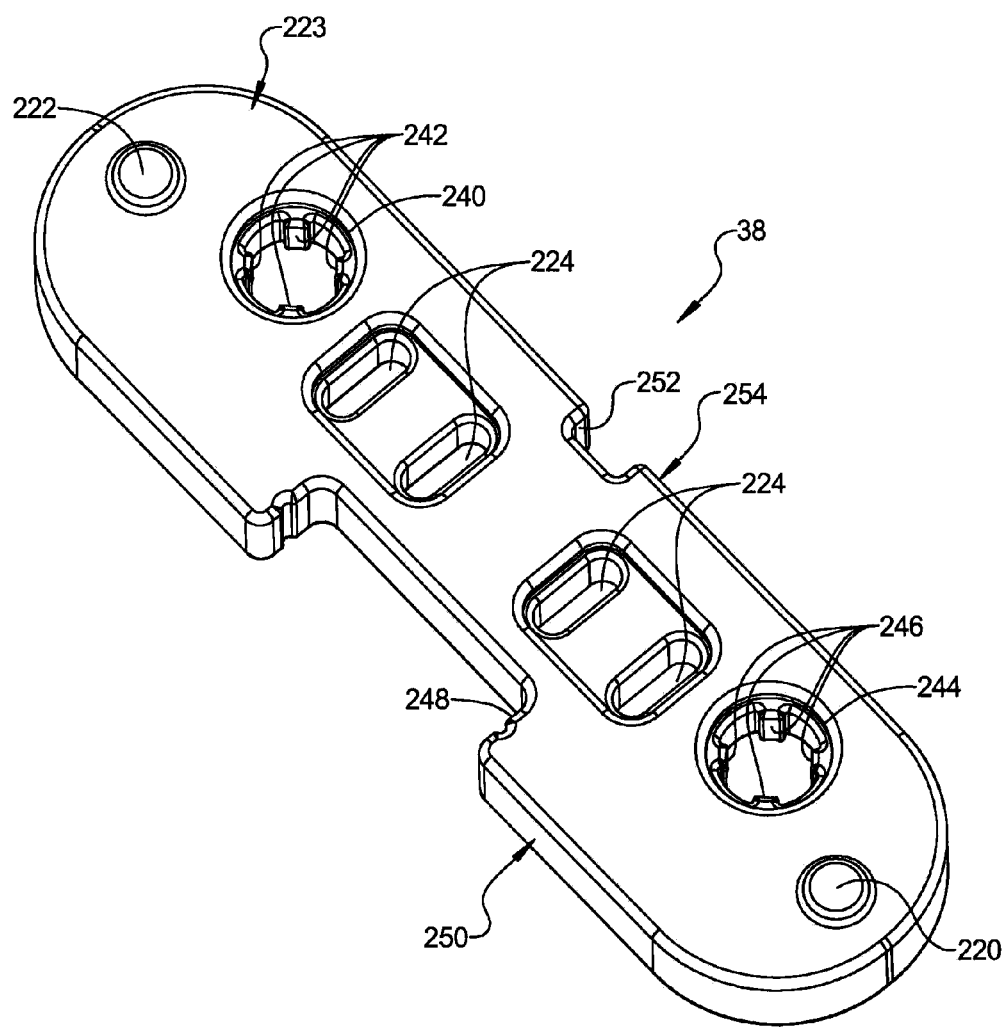
FIG. 18 is a top perspective view of a pier segment.

Referring to FIG. 18, each of the pier segments is identical; therefore, the following discussion of first pier segment 38 applies equally to all of the other pier segments. First pier segment 38 includes first and second male alignment members 220, 222 extending upwardly from upward facing surface 223, as previously described. A first support shaft cylinder clearance aperture 240 defines a thru aperture. A plurality of first support shaft cylinder alignment pads 242 extends further inwardly, with respect to the inner diameter of first support shaft cylinder clearance aperture 240, to align support shaft cylinders 34 or 84. A second support shaft cylinder clearance aperture 244, having a plurality of second support shaft cylinder alignment pads 246, receives the other one of the support shaft cylinder 34, 84. A recess 248 is created in an outer facing wall 250, and a second recess 252 is created on an oppositely inner facing wall 254. Recess 248 can be used, for example, for containment of a portion of the power cable 66, shown and described in reference to FIG. 1, as well as to mount the cable guard 67. Second recess 252 can be used as a guide for one of the first or second ballast tanks 100, 102.

Referring to FIG. 19 and again to FIG. 6, the rotational fastener 158 rotationally supports second elliptical member 155 while also maintaining the spacing between second elliptical member 155 and elliptical member connecting mount 164. As previously noted, second elliptical member 155 rotates rotational pin 190 which is rotatably received in an aperture 256 of a connecting arm end 258 of first wing set connecting arm 54. A duplicate connecting structure to rotational pin 190 (not shown in detail) is provided for connecting second wing set connecting rod 88 to elliptical member connecting mount 165 which rotatably mounts fourth elliptical member 157. Rotational pin 190 is connected to sliding structure 192 which is fixedly connected to a piston rod 260. Piston rod 260 is fixed to a piston 262 which is slidably received in a piston chamber 264 defined by a cylinder 266 fixedly connected to second elliptical member 155. Axial displacement of piston 262 in piston chamber 264 displaces rotational pin 190 to affect the position of first wing set connecting arm 54.

Figure 19:
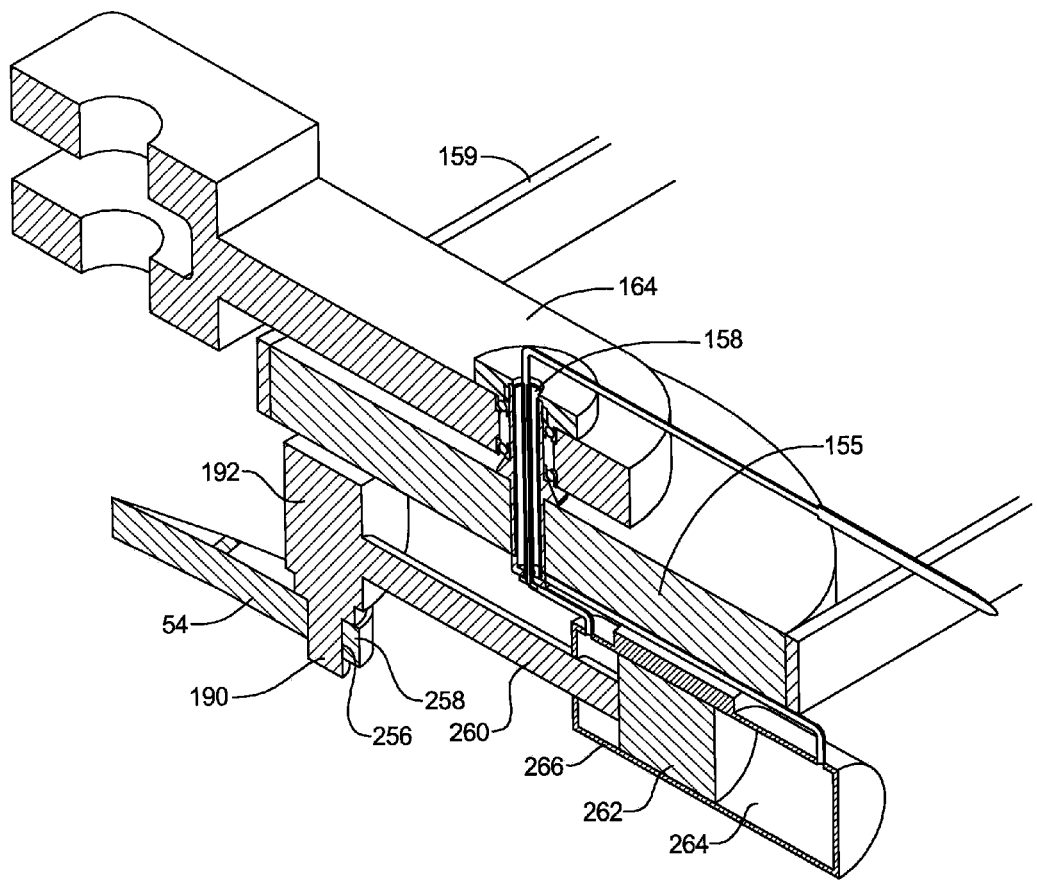
FIG. 19 is a cross sectional perspective view taken at section 19 of FIG. 6.

Referring to FIG. 20 and again to FIGS. 1 and 19, a control device 268 is defined by rotational pin 190, sliding structure 192, piston rod 260, piston 262, cylinder 266, and second elliptical member 155. Control device 268 displaces first wing set connecting arm 54 to provide control of the angle of attack α of the first wing assembly 12. A similar control device is used to control the angle of attack of second wing assembly 14. A flange 270 extending from cylinder 266 is connected to an underside 272 of second elliptical member 155 to non-rotationally fix cylinder 266 to second elliptical member 155. Fluid pressure such as from a source of pressurized air is provided to move piston 262 in piston chamber 264 in either of a piston extending direction "U" or a piston retracting direction "V". Fluid pressure is provided to cylinder 266 by a first piston side pressure line 274 to move piston rod 260 in the piston extending direction "U". Conversely, fluid pressure is provided to cylinder 266 by a second piston side pressure line 276 to move piston rod 260 in the piston retracting direction "V".

Rotational fastener 158 includes the following features which permit rotation of second elliptical member 155 with respect to elliptical member connecting mount 164 by the force of elliptical member drive belt 159. Rotational fastener 158 includes a hollow tubular body 278 having an inner pressure chamber 280. Tubular body 278 is fixed against rotation with respect to second elliptical member 155, but is rotationally disposed with respect to elliptical member connecting mount 164 by first and second bearing assemblies 282, 284. A first fluid pressure supply line 286 delivers pressurized fluid to a pressure fitting 288 which opens into inner pressure chamber 280 of tubular body 278. First piston side pressure line 274 is connected through a wall of tubular body 278 to inner pressure chamber 280. A second fluid pressure supply line 290 is connected to and delivers pressurized fluid to a pressure cap 292 fixed to pressure fitting 288. An axial extension tube 294 extends through inner pressure chamber 280 of tubular body 278. A pressure seal 296 is located between pressure cap 292 and axial extension tube 294 so pressure in inner pressure chamber 280 is isolated from axial extension tube 294. Pressure cap 292 is fixed to pressure fitting 288, which is fixed to an upper surface 298 of elliptical member connecting mount 164. A portion of second piston side pressure line 276 is positioned within and extends through axial extension tube 294 and is sealed from inner pressure chamber 280 at pressure seal 296 such that the pressurized fluid in second fluid pressure supply line 290 can enter second piston side pressure line 276. This configuration permits rotation of elliptical member connecting mount 164 with respect to second elliptical member 155 while permitting pressure fluid flow to cylinder 266 and isolating pressure between first and second piston side pressure lines 274 and 276.

Figure 21:
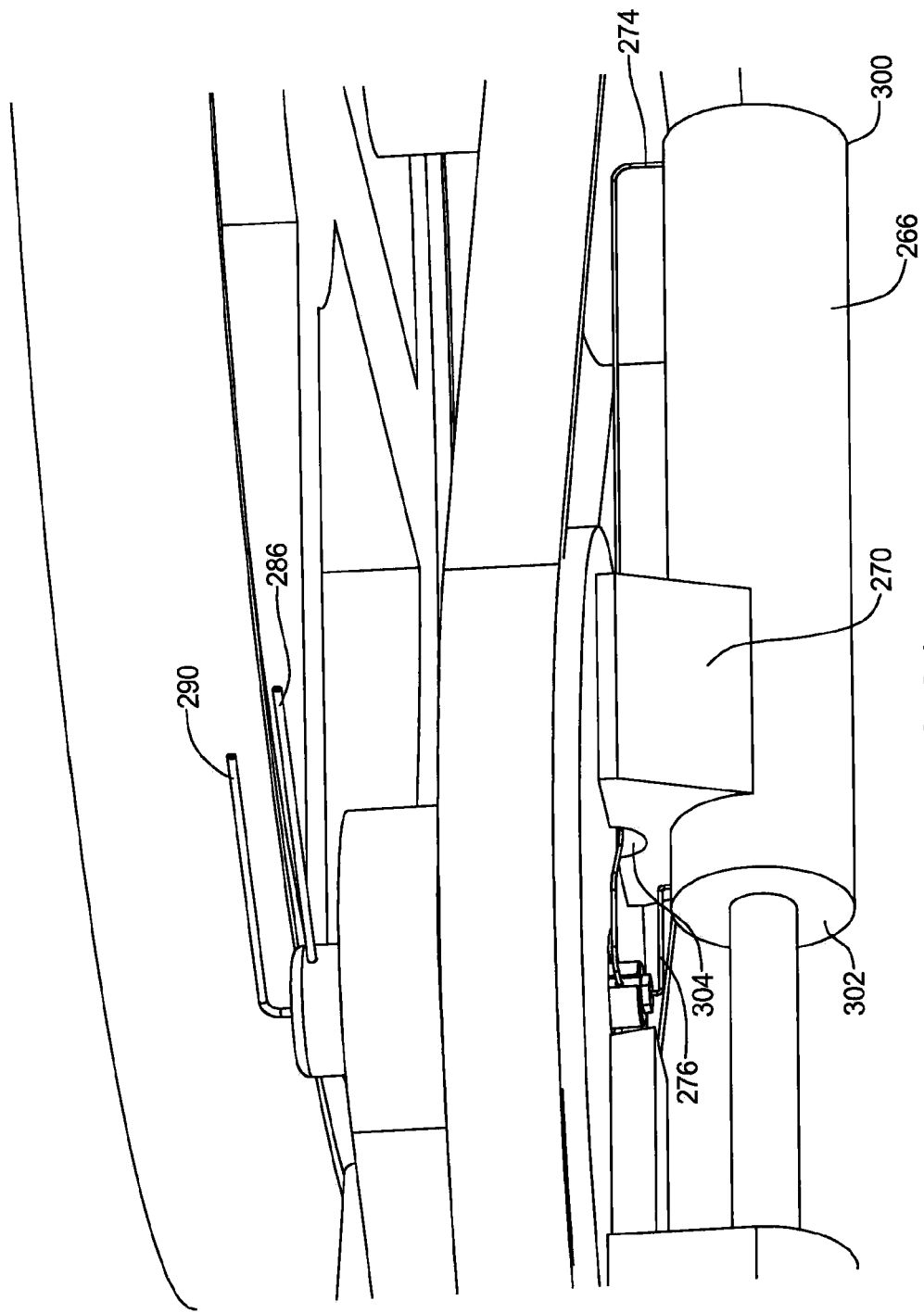
FIG. 21 is a cross sectional perspective view similar to FIG. 19, further showing details of differential pressure tubing and connections.

Referring to FIG. 21, first piston side pressure line 274 is connected to a cylinder first end 300 of cylinder 266, and second piston side pressure line 276 is connected to a cylinder second end 302 of cylinder 266. A clearance aperture 304 can be created through flange 270 to permit passage of first piston side pressure line 274.

Figure 22:
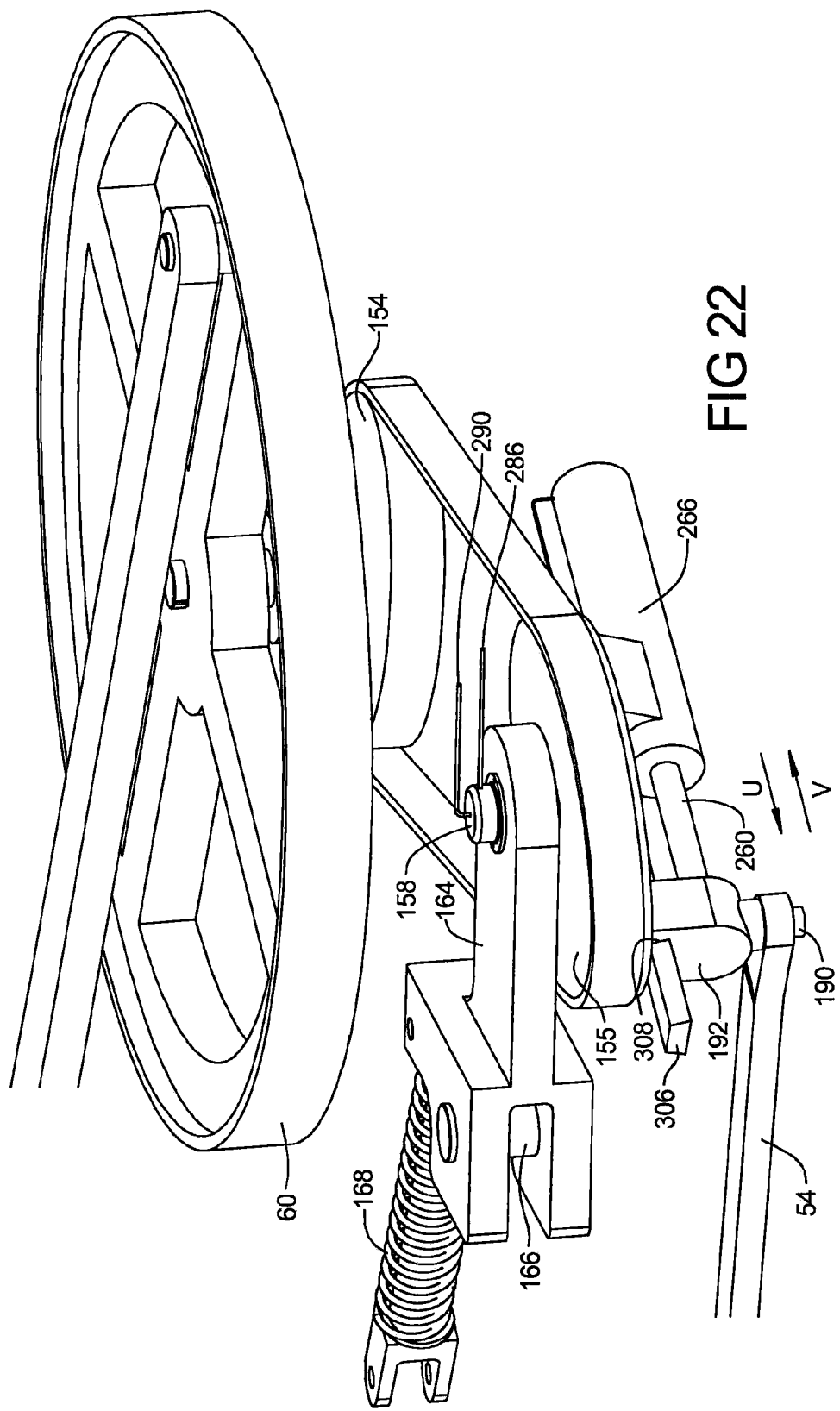
FIG. 22 is a side elevational view of the components of FIG. 19.

Referring to FIG. 22 and again to FIGS. 1 and 19-21, as piston rod 260 is moved in either the piston extending direction "U" or piston retracting direction "V", sliding structure 192 also extends or retracts by sliding with respect to a geometrically shaped alignment rod 306 which is fixed to second elliptical member 155. Alignment rod 306 is slidably disposed in a correspondingly geometrically shaped alignment rod receiving aperture 308 created in sliding structure 192. Alignment rod 306 is shaped to prevent rotation of sliding structure 192 as it slides along alignment rod 306, and therefore can include at least one flat surface, or a non-circular shape. The extension or retraction of sliding structure 192 changes the extension of first wing set connecting arm 54, which changes the angle of attack of first wing assembly 12 up to approximately 15 degrees.

Figure 23:
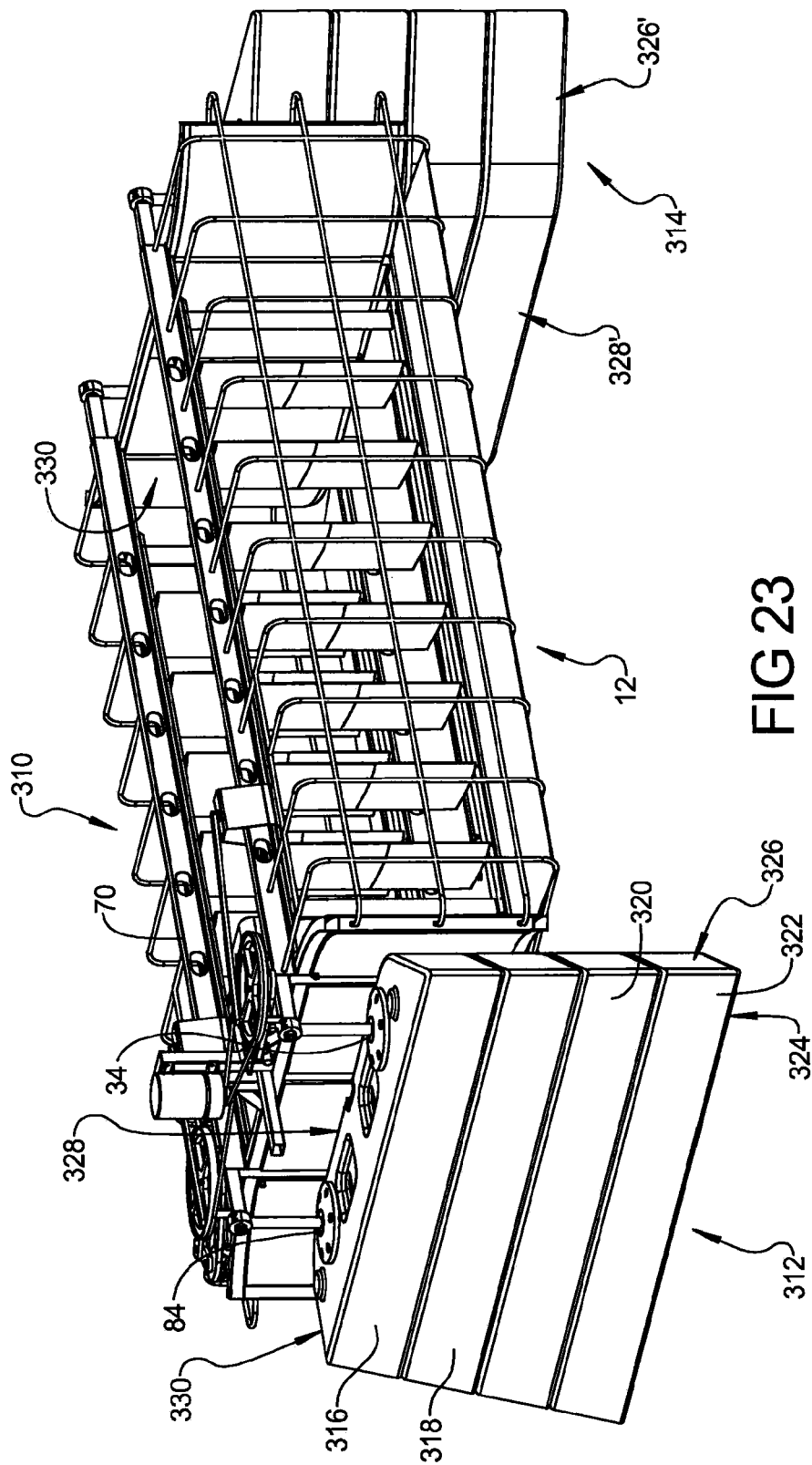
FIG. 23 is a front perspective view of area 23 of FIG. 6.

Referring to FIG. 23 and again to FIGS. 1 and 4, a hydrokinetic electrical generating device 310 is modified from hydrokinetic electrical generating device 10 by the use of first and second multiple segment piers 312, 314. First and second multiple segment piers 312, 314 are mirror images of each other and can be used when a wider base or "footprint" is required to support hydrokinetic electrical generating device 310, for example if water velocities are commonly at the highest end of the velocity range (e.g., 4 to 5 knots), minor ice loading or ice flow is anticipated, or if material of the bed 132 is soft such as sand or silt material. A first pier segment 316 has the smallest volume/space envelope, and each successive pier segment such as second, third and fourth pier segments 318, 320, 322 successively increase in volume/space envelope. A bed facing surface 324 of fourth pier segment 322 (or the lowest positioned pier segment of the multiple segment pier) has the greatest surface area of any of the pier segments 316, 318, 320, 322.

Referring still to FIG. 23 and again to FIG. 2, first and second multiple segment piers 312, 314 also have substantially flat first faces 326, 326' that extend away from planar portions 328, 328'. Substantially flat second faces 330, 330' also extend away from planar portions 328, 328'. The flat first and second faces 326, 326' and 330, 330' enhance the function provided by first curved portions 104, 110 and second curved portions 108, 114 of first and second ballast tanks 100, 102, which includes directing water flow from flow field "G" into flow throat "F" to increase the velocity of flow in flow throat "F". First and second wing assemblies 12, 14 are connected to first and second multiple segment piers 312, 314 using support shaft cylinders 34, 84 similar to first and second multiple segment piers 36, 37.

Figure 24:
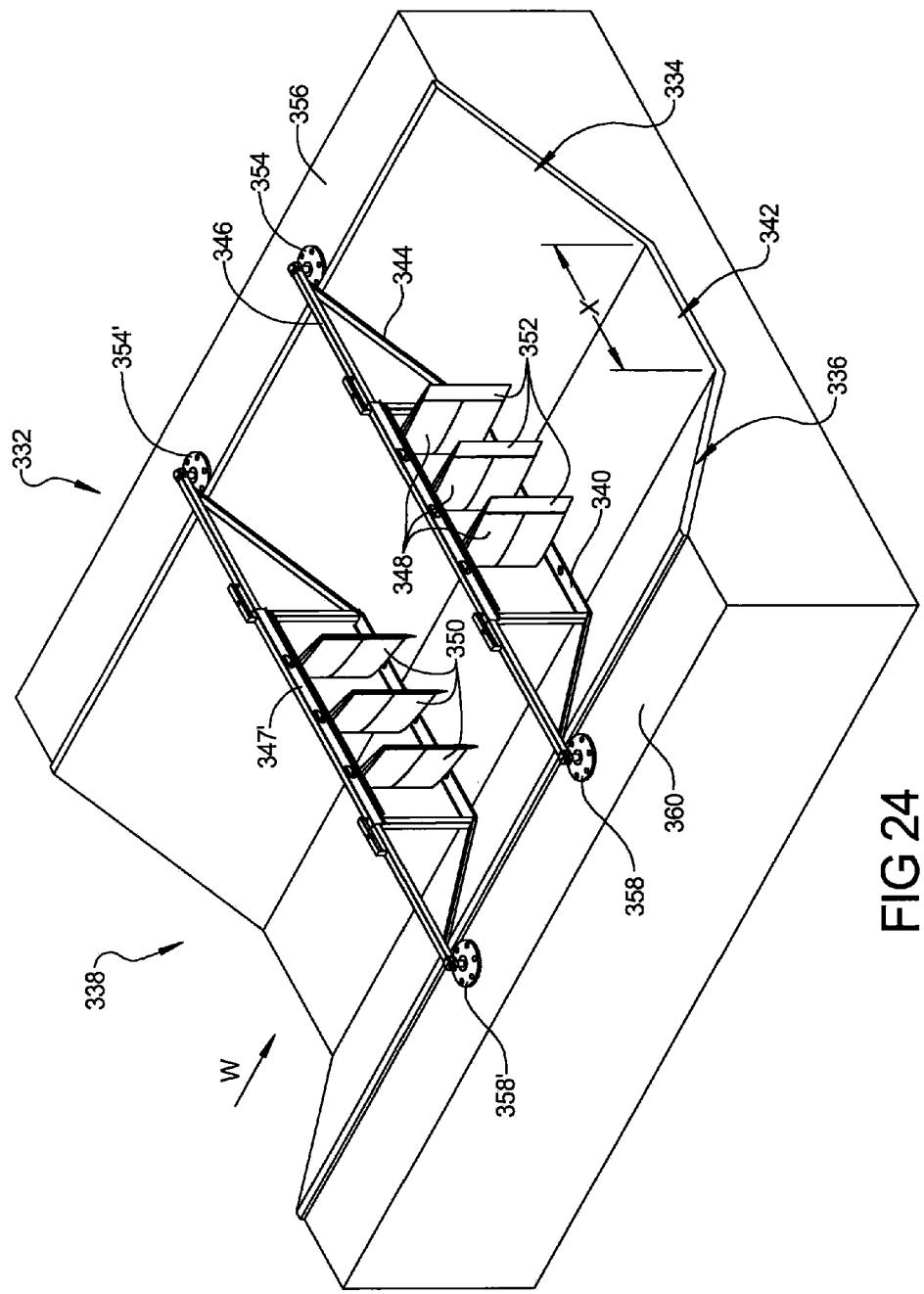
FIG. 24 is a partial top left rear perspective view of a partially constructed hydrokinetic electrical generating device modified for use in a defined channel or canal.

Referring to FIG. 24, a hydrokinetic electrical generating device 332 is modified to be installed between first and second tapering channel walls 334, 336 of a canal or channel 338 receiving water flow in a flow direction "W". A lower wing beam 340 is modified to fit within a spacing dimension "X" defined by a lower wall 342 of channel 338. Channel wall support legs 344 connected to lower wing beam 340 are angled to substantially match the angle or pitch of first and second tapering channel walls 334, 336. Channel wall support legs 344 connect to outward extents of an upper wing beam 346. An upper sliding member 347 rotatably supports a second or rear wing assembly 348. Similarly, an upper sliding member 347' rotatably supports a first or forward wing assembly 350.

The quantity of wings of each wing assembly 348, 350 can be reduced compared to previous embodiments to suit movement clearance within spacing dimension "X". Each wing of the first and second wing assemblies 348, 350 includes an aileron 352 at the trailing edge of the wing. Ailerons 352 further increase each wing's resistance to water flow and therefore generate additional overall wing rotation force. A support shaft cylinder 354, 354' allows vertical motion of hydrokinetic electrical generating device 332 with respect to an upper surface 356 defined at the extent of first tapering channel wall 334. Similarly, a support shaft cylinder 358, 358' allows vertical motion of hydrokinetic electrical generating device 332 with respect to an upper surface 360 defined at the extent of second tapering channel wall 336.

Figure 25:
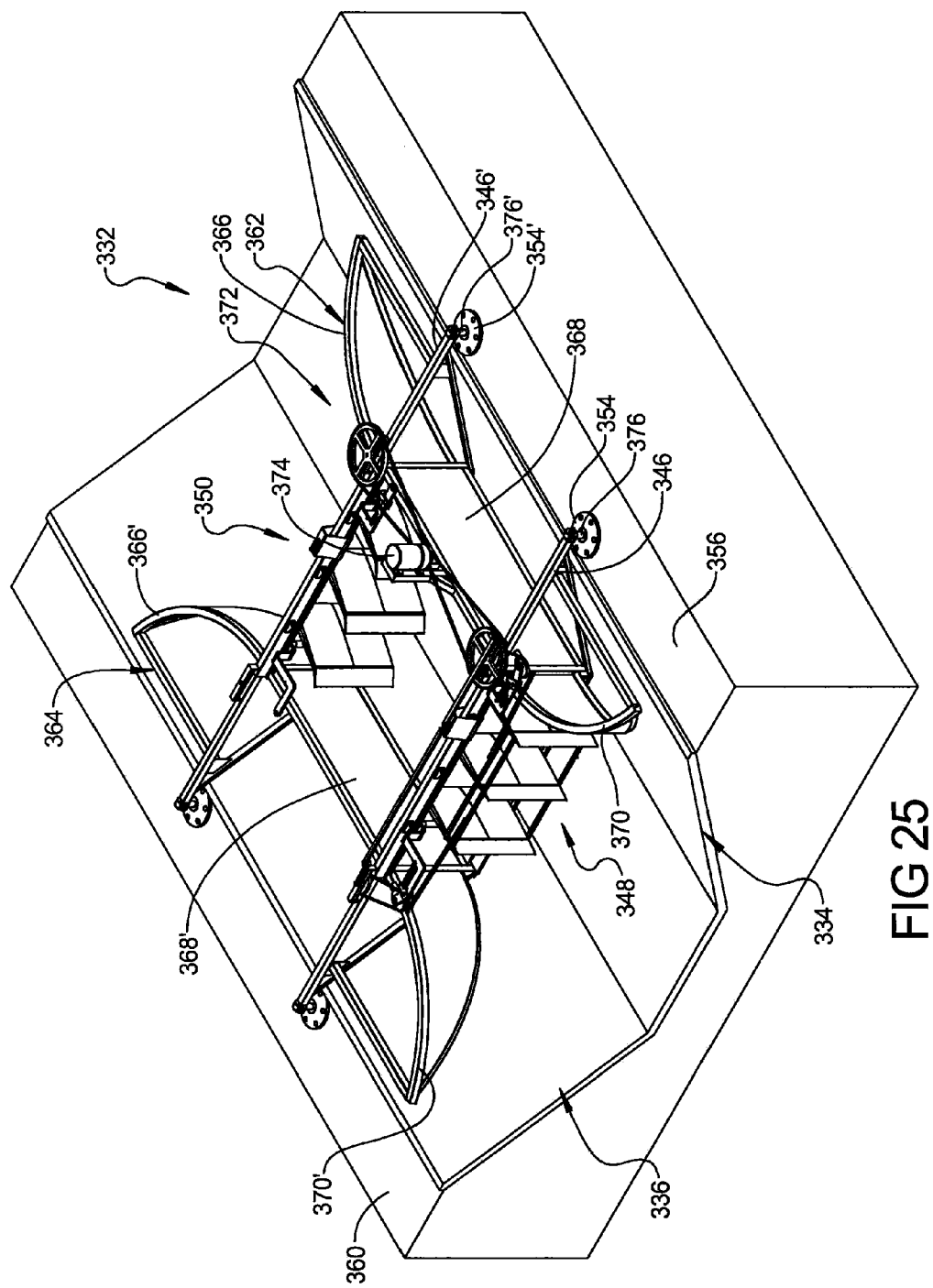
FIG. 25 is a partial top right rear perspective view of the hydrokinetic electrical generating device of FIG. 24.

Referring to FIG. 25, hydraulic electrical generating device 332 further includes first and second flow diverters 362, 364. Each of the first and second flow diverters 362, 364 include an inlet flow diverter portion 366, 366', a central planar portion 368, 368', and an outlet flow diverter portion 370, 370'. According to several embodiments, each of the portions of the first and second flow diverters 362, 364 can also function as buoyancy tanks. In other embodiments, only the central planar portion 368, 368' functions as the buoyancy tank. A mechanical-electrical section 372 is similar to mechanical-electrical section 16 and will, therefore, not be further discussed herein. A/C generator 374 is powered by mechanical-electrical section 372 producing an electrical current for offsite distribution. Support shafts 376, 376' connect the outboard ends of upper wing beam 346, 346' to support shaft cylinders 354, 354' and thereby permit vertical displacement provided by the buoyancy tanks of the first and second flow diverters 362, 364. First and second flow diverters 362, 364 are shaped to advantageously contact a maximum portion of first and second tapering channel walls 334, 336 to maximize the volume of water directed between central planar portions 368, 368'.

Figure 26:
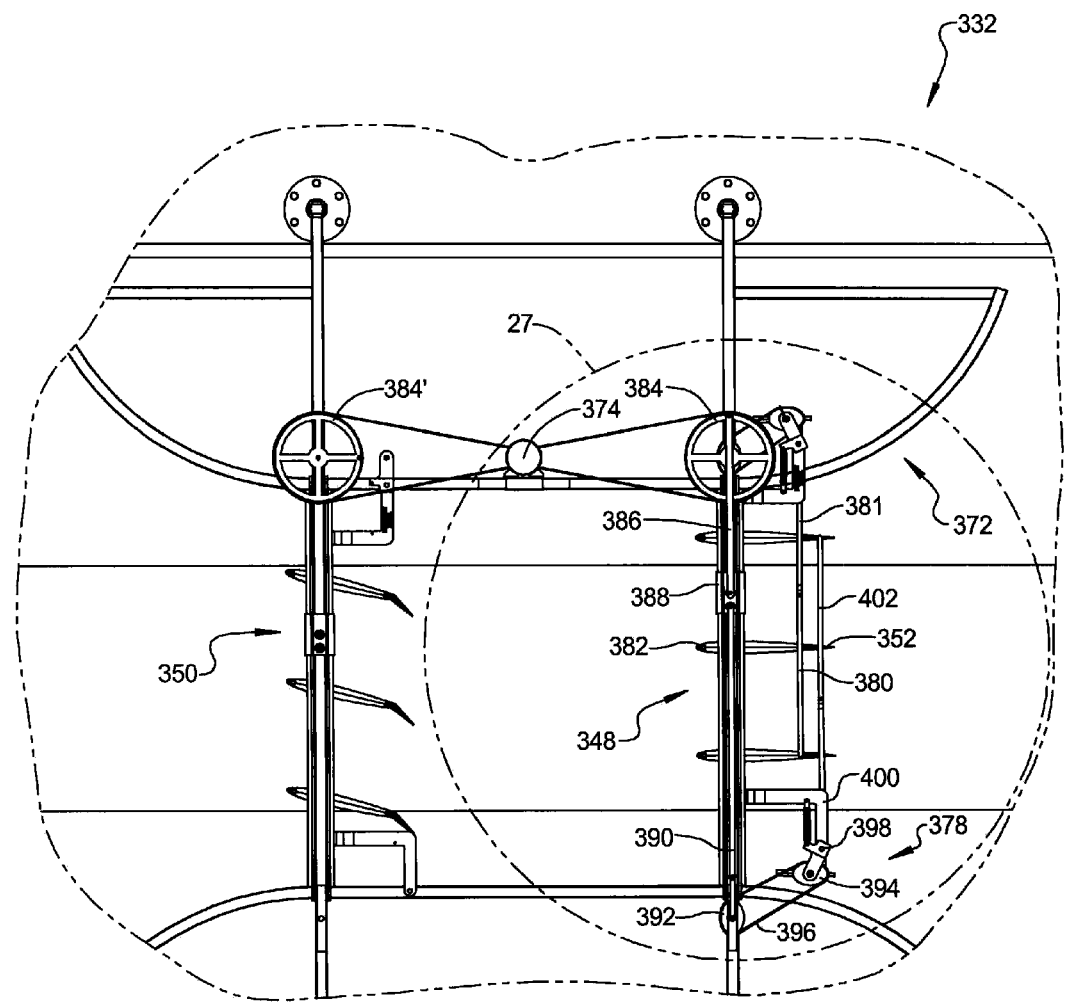
FIG. 26 is a top plan view of the hydrokinetic electrical generating device of FIG. 24.

Referring to FIG. 26, hydraulic electrical generating device 332 further includes an aileron positioning system 378, which is used to position the individual ailerons 352. Mechanical-electrical section 372 includes a wing set control arm 380 connected to a wing set connecting rod 381, which together provide the angle of attack for the plurality of wings 382 of the rear wing assembly 348. Similar components are used for operation of the wings of forward wing assembly 350. A flywheel 384, 384' rotated by the motion of the individual wings 382 of both the rear wing assembly 348 and forward wing assembly 350 together rotate A/C generator 374. A flywheel connecting rod 386 is connected between the flywheel 384 and a slide connector 388.

Aileron positioning system 378 further includes an aileron drive rod 390, which is also rotatably connected to slide connector 388. Aileron drive rod 390 is connected to rotate a first aileron elliptical member 392, which rotates a second aileron elliptical member 394 using an aileron drive belt 396. Second aileron elliptical member 394 is rotatably connected to an elliptical member connecting mount 398, which is rotatably connected to an L-shaped arm 400. Rotation of second aileron elliptical member 394 acts through an aileron control arm 402 to collectively rotate the ailerons 352 of each of the wings 382 of the individual rear or forward wing assemblies 348, 350.

Figure 20:
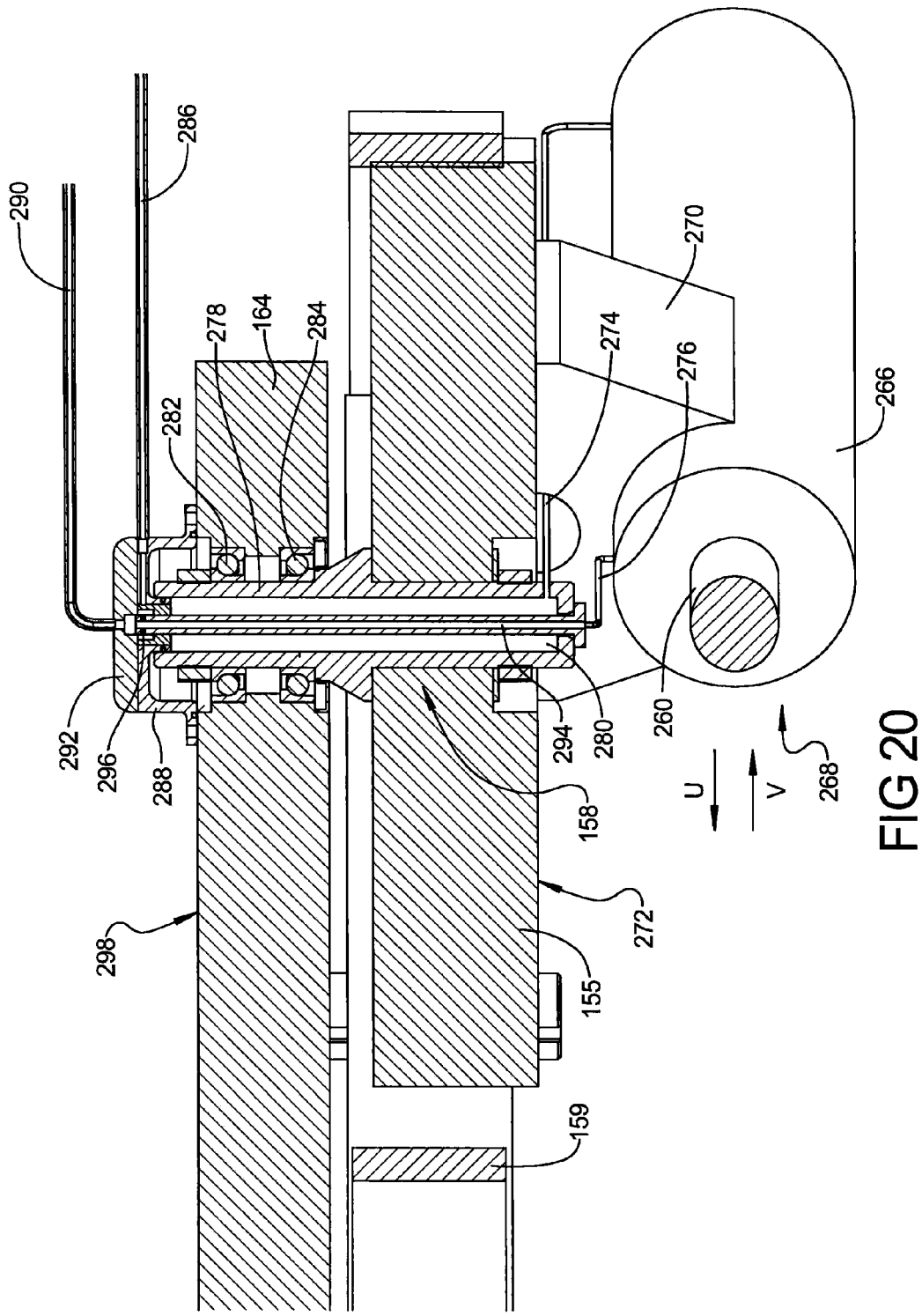
FIG. 20 is a top front right perspective view of another embodiment for a hydrokinetic electrical generating device supported by modified multiple segment piers.
Figure 27:
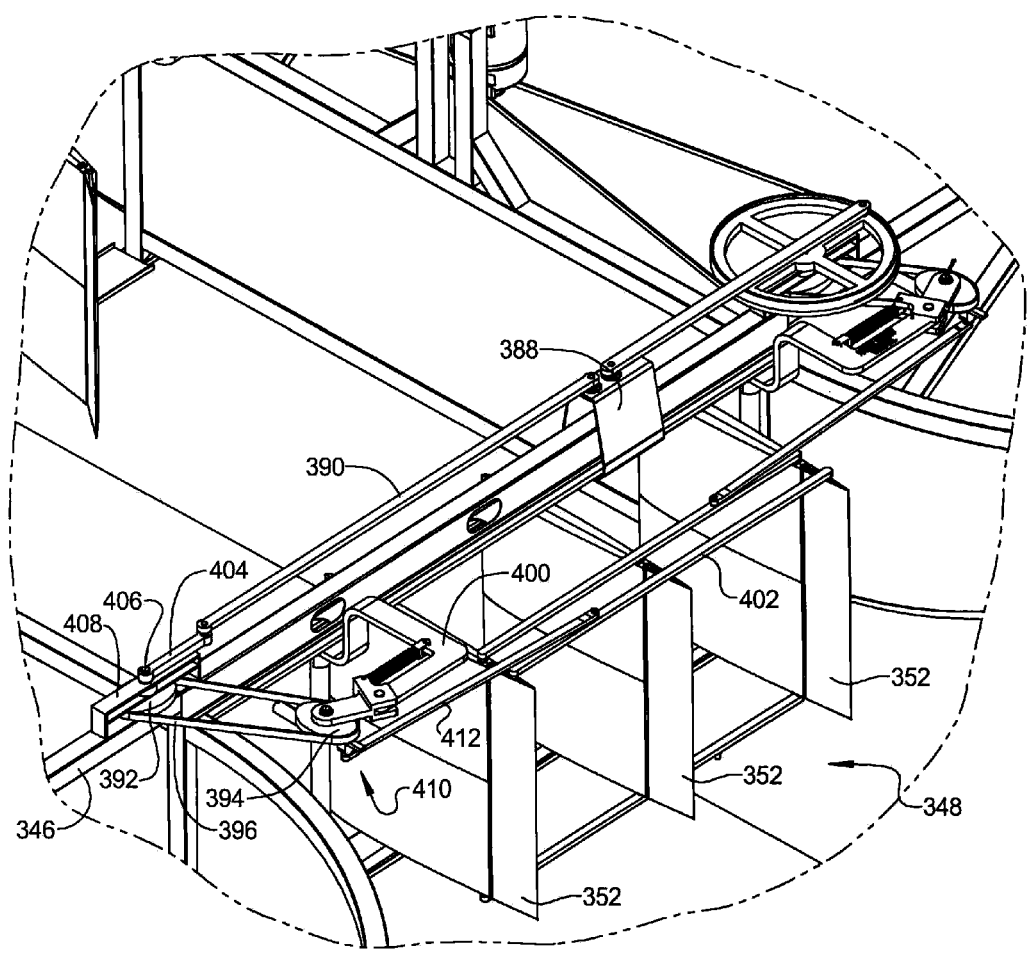
FIG. 27 is a top left rear perspective view of area 27 of FIG. 26.

Referring to FIG. 27, aileron drive rod 390 can be rotatably connected using a connecting link 404 to a shaft 406 upon which first aileron elliptical member 392 is rotatably connected. First aileron elliptical member 392 is further partially contained within a housing 408 fixed to upper wing beam 346. Shaft 406, therefore, is also rotatably received through upper wing beam 346. A control device 410, similar in construction and operation to control device 268 previously described with respect to FIG. 20, is used to make incremental adjustments of the individual ailerons 352 using an aileron connecting rod 412 connected to aileron control arm 402.

Referring to FIG. 28, each of the ailerons 352 are connected to the individual wings 382 using an aileron rotation shaft 414. Aileron rotation shaft 414 is positioned proximate to a trailing end 416 of wings 382. Rotation of the individual ailerons 352 with respect to wing 382 is, therefore, in addition to the rotation of wing 382 with respect to pivot rod 24' and/or movement of the wing 382 at wing spacing shaft 228'. Ailerons 352 are capable of rotation up to approximately 60 degrees with respect to an axis defined through wing 382.

Referring to FIG. 29, internal details of each wing 382 include a shaft containment member 418, which slidably and rotatably receives the aileron rotation shaft 414. A rear vertical member 420 similar to shaft containment member 418 is connected to shaft containment member 418 using a plurality of substantially horizontally oriented aileron stiffener members 422. Shaft containment member 230' is fixedly connected to shaft containment member 418 using a plurality of joining members 424.

A hydrokinetic electrical generating device of the present disclosure offers several advantages. In using a vertical wing design in a low velocity water flow field (less than or equal to approximately 5 knots) to convert the force of the flowing water to electrical power there is less inherent stress on the wing structure allowing for a lighter, less expensive construction using an interior metal such as aluminum (marine grade) frame encapsulated in a strong, buoyant co-polymer wing enclosure. Use of vertical wings compared to horizontal wings improves efficiency because vertically oriented wings in a water flow field do not lose part of the energy of the water flow due to moving the wing against the force of gravity during any phase of its motion. The use of a timed elliptical gearing system of the present disclosure allows the wings of one or more wing sets to begin motion at a first end of travel of each set, sweeping a rear of one or more sets of wings, and then reversing the angle of attack of the wings to move the wing assembly in an opposite direction until the wing assembly reaches the other end of travel where it is reversed and begins the motion again, creating a continuous cycle moving in a sinusoidal pattern. Use of a neutrally buoyant generation unit that can be raised or lowered keeps the wing assemblies in upper (highest velocity) flow region of the flow field which maximizes power output.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention. For example, wings of the present disclosure are described as vertical, however, wing orientation that varies from vertical can also be used within the scope of the present disclosure, including wings tipped up to approximately 45 degrees from vertical. Two sets of wings are described herein however the present disclosure is not limited to any quantity of wing sets. One, two, or more sets of wings can be used. An AC generator is described herein however a DC generator can also be used.

What is claimed is:

1. A hydrokinetic electrical generating device, comprising:
   at least one wing assembly having at least one axis vertical wing;
   a horizontal wing support beam assembly having at least one sliding member slidably connected to the wing support beam assembly;
   a pivot rod extending from the at least one wing and rotatably connected to the at least one sliding member such that the at least one wing is rotatable with respect to the pivot rod as the at least one sliding member slides with respect to the wing support beam assembly;
   a mechanical-electrical section having a flywheel rotatably connected by a drive belt to an electrical generator;
   a slide connector connected to the at least one sliding member; and
   a flywheel connecting rod rotatably connected to both the slide connector and the flywheel, such that sliding motion of the at least one sliding member due to a water flow force acting on the at least one wing transferred through the pivot rod to displace the at least one sliding member acts through the flywheel connecting rod to rotate the flywheel and via the drive belt acts to rotate the electrical generator.

2. The hydrokinetic electrical generating device of claim 1, further including a first elliptical member connected together with the flywheel to a shaft such that the first elliptical member is co-rotatable with the flywheel.

3. The hydrokinetic electrical generating device of claim 2, further including a second elliptical member rotatably connected by a rotational fastener to a wing orientation control device, the second elliptical member connected for rotation to the first elliptical member by a first elliptical member drive belt.

4. The hydrokinetic electrical generating device of claim 3, further including a control arm rotatably connected to the at least one wing and to the wing orientation control device.

5. The hydrokinetic electrical generating device of claim 4, wherein the wing orientation control device includes:
 a cylinder connected to the second elliptical member having a chamber;
 a piston slidably received in the chamber and operating to extend or retract a piston rod in response to a pressurized fluid being received in the chamber; and
 a rotational fastener rotatably connecting the second elliptical member to an elliptical member connecting mount, the piston rod extending or retracting to change an extension of the control arm to vary an angle of attack of the at least one axis vertical wing.

6. The hydrokinetic electrical generating device of claim 1, wherein the at least one axis vertical wing comprises a plurality of axis vertical wings.

7. The hydrokinetic electrical generating device of claim 6, wherein the at least one wing assembly includes first and second wing assemblies, the first wing assembly having a first portion of the plurality of the axis vertical wings and the second wing assembly having a second portion of the plurality of the axis vertical wings.

8. The hydrokinetic electrical generating device of claim 1, further including:
 first and second support shafts individually connected at opposed first and second ends of the wing support beam and oriented substantially perpendicular to the wing support beam; and
 first and second support shaft cylinders each slidably receiving one of the first and second support shafts.

9. The hydrokinetic electrical generating device of claim 8, further including first and second multiple segment piers, the first shaft cylinder connected to the first multiple segment pier and the second shaft cylinder connected to the second multiple segment pier such that the at least one wing assembly is movable vertically in each of a rising direction and a lowering direction by sliding motion of the first and second support shafts within the first and second support shaft cylinders.

10. The hydrokinetic electrical generating device of claim 9, further including:
 a first ballast tank fixedly connected to the first end of the wing support beam; and
 a second ballast tank fixedly connected to the second end of the wing support beam, wherein motion in the rising direction is assisted by a buoyancy force created by the first and second ballast tanks.

11. The hydrokinetic electrical generating device of claim 1, further including an aileron rotatably connected to a wing trailing end of the at least one axis vertical wing and rotatable independent of rotation of the at least one axis vertical wing about the pivot rod.

12. The hydrokinetic electrical generating device of claim 11, further including an aileron control device including:
 an aileron drive rod connected to the slide member;
 first and second aileron elliptical members rotatably connected by a aileron drive belt; and
an aileron control arm rotatably connected to the aileron and movable in response to rotation of the first and second aileron elliptical members.

13. A hydrokinetic electrical generating device, comprising:
 first and second wing assemblies each having axis vertical wings;
 first and second horizontal wing support beam assemblies each supporting one of the first or second wing assemblies;
 first and second sliding members, the first sliding member slidably connected to the first wing support beam assembly and the second sliding member slidably connected to the second wing support beam assembly, the axis vertical wings rotatably connected to one of the first or second sliding members;
 a first sliding connector connected to the first sliding member and a second sliding connector connected to the second sliding member;
 a mechanical-electrical section having first and second flywheels individually rotatably connected by one of first and second flywheel drive belts to a generator; and
 a first flywheel connecting rod connecting the first sliding connector to the first flywheel and a second flywheel connecting rod connecting the second sliding connector to the second flywheel such that a water force causing rotation of the axis vertical wings of the first and second wing sets causes rotation of the first and second flywheels to thereby operate the generator.

14. The hydrokinetic electrical generating device of claim 13, further including:
 a first elliptical member connected together with the first flywheel to a first shaft such that the first elliptical member is co-rotatable with the first flywheel; and
 a second elliptical member rotatably connected by a first elliptical member drive belt to the first elliptical member and rotatably connected by a rotational fastener to a first wing orientation control device.

15. The hydrokinetic electrical generating device of claim 14, further including:
 a third elliptical member connected together with the second flywheel to a second shaft such that the third elliptical member is co-rotatable with the second flywheel; and
 a fourth elliptical member rotatably connected by a second elliptical member drive belt to the third elliptical member and rotatably connected by a rotational fastener to a second wing orientation control device.

16. The hydrokinetic electrical generating device of claim 15, further including:
 a rotational pin integrally connected to each of the second and fourth elliptical members; and
 a first connecting rod rotatably connected to the first rotational pin and to a first wing set control arm, and a second connecting rod rotatably connected to the second rotational pin and to a second wing set control arm.

17. The hydrokinetic electrical generating device of claim 13, wherein:
 the first horizontal wing support beam assembly includes a first upper wing beam and a first lower wing beam; and the second horizontal wing support beam assembly includes a second upper wing beam and a second lower wing beam.

18. The hydrokinetic electrical generating device of claim 17, wherein:
the first sliding member further includes a first upper sliding member connected to the first upper wing beam and a first lower sliding member connected to the first lower wing beam; and
the second sliding member further includes a second upper sliding member connected to the second upper wing beam and a second lower sliding member connected to the second lower wing beam.

19. The hydrokinetic electrical generating device of claim 18, further including a pivot rod extending from each of the axis vertical wings defining a rotational axis of each axis vertical wing, the pivot rod of individual ones of the axis vertical wings rotatably connected either to both the first upper and lower sliding members or both the second upper and lower sliding members.

20. The hydrokinetic electrical generating device of claim 13, wherein the axis vertical wings of the first wing assembly are independently rotatable with respect to the axis vertical wings of the second wing assembly by the first sliding member being slidable independently of the second sliding member.

21. The hydrokinetic electrical generating device of claim 13, further including first and second wing set control arms, the first wing set control arm rotatably connected to and movable to collectively rotate the axis vertical wings of the first wing assembly and the second wing set control arm rotatably connected to and movable to collectively rotate the axis vertical wings of the second wing assembly.

22. The hydrokinetic electrical generating device of claim 13, further including:
a first ballast tank fixedly connected to each of the first and second horizontal wing support beam assemblies; and
a second ballast tank fixedly connected to each of the first and second horizontal wing support beam assemblies, wherein a motion of the first and second wing assemblies in a rising direction is assisted by a buoyancy force created by the first and second ballast tanks.

23. The hydrokinetic electrical generating device of claim 22, wherein each of the first and second ballast tanks includes:
a first curved portion, the first curved portion of the first and second ballast tanks defining a flow field between them; and
a planar portion, the planar portion of the first and second ballast tanks defining a flow throat between them, the flow throat being narrower than the flow field thereby increasing a water flow velocity in the flow throat compared an inlet water flow velocity of the flow field.

24. A hydrokinetic electrical generating device, comprising:
a wing assembly having at least one axially vertical oriented wing;
a horizontal wing support beam assembly having at least one sliding member slidably connected to the wing support beam assembly;
a pivot rod extending from the at least one wing and rotatably connected to the at least one sliding member such that the at least one wing is rotatable with respect to the pivot rod as the at least one sliding member slides with respect to the wing support beam assembly;
a mechanical-electrical section having a flywheel rotatably connected by a flywheel drive belt to an electrical generator, a first elliptical member co-rotatable with the flywheel, and a second elliptical member rotatably connected by an elliptical member drive belt to the first elliptical member;
a slide connector slidably connected to the at least one sliding member; and
a flywheel connecting rod rotatably connected to the slide connector and to the flywheel, such that sliding motion of the at least one sliding member due to a force acting on the at least one wing transferred through the pivot rod to displace the at least one sliding member acts through the flywheel connecting rod to rotate the flywheel and via the drive belt acts to rotate the generator.

25. The hydrokinetic electrical generating device of claim 24, further including a control arm rotatably connected to the at least one wing.

26. The hydrokinetic electrical generating device of claim 25, wherein the at least one wing comprises a plurality of wings each commonly connected to the control arm such that an angle of attack of any individual one of the plurality of wings is equal to any other individual one of the plurality of wings.

27. The hydrokinetic electrical generating device of claim 26, wherein the second elliptical member is rotatably connected by a rotational fastener to a wing orientation control device operating to displace the control arm and change the angle of attack of the plurality of wings.

28. The hydrokinetic electrical generating device of claim 26, wherein the plurality of wings are collectively movable by displacement of the control arm to position the wings between a maximum angle of attack and a zero angle of attack.

29. The hydrokinetic electrical generating device of claim 24, further including first and second piers supporting the horizontal wing support beam assembly between the first and second piers.

30. The hydrokinetic electrical generating device of claim 29, wherein the first and second piers each include multiple pier segments, each of the pier segments having first and second male alignment members operating to engage successive ones of the multiple pier segments.

31. A hydrokinetic electrical generating device, comprising:
at least one wing assembly having a plurality of axis vertical wings;
a horizontal wing support beam assembly having at least one sliding member slidably connected to the wing support beam assembly;
first and second piers supporting the horizontal wing support beam assembly between the first and second piers;
a pivot rod extending from individual ones of the plurality of wings and rotatably connected to the at least one sliding member such that each of the plurality of wings is rotatable with respect to the pivot rod as the at least one sliding member slides with respect to the wing support beam assembly moving the at least one wing assembly horizontally toward and away from the first pier;
a mechanical-electrical section having a flywheel rotatably connected by a flywheel drive belt to an electrical generator, the flywheel linked to the at least one wing set and rotated by the horizontal motion of the at least one wing assembly to operate the generator.

32. The hydrokinetic electrical generating device of claim 31, further including a slide connector slidably connected to the at least one sliding member.

33. The hydrokinetic electrical generating device of claim 32, further including a flywheel connecting rod rotatably connected to both the slide connector and the flywheel.

34. The hydrokinetic electrical generating device of claim 33, further including an aileron rotatably connected to individual ones of the plurality of axis vertical wings using an aileron rotation shaft, wherein a water flow force acting on the plurality of wings is transferred through the pivot rod and the aileron rotation shaft of the wings to displace the at least one sliding member and thereby the flywheel connecting rod to rotate the flywheel rotating the drive belt to operate the generator.

\* \* \* \* \*